US011190238B2

United States Patent
Lange

(10) Patent No.: US 11,190,238 B2
(45) Date of Patent: Nov. 30, 2021

(54) HYBRID RAN/DIGITAL DAS REPEATER SYSTEM WITH ETHERNET TRANSPORT

(71) Applicant: Andrew Wireless Systems GmbH, Buchdorf (DE)

(72) Inventor: Keld Knut Lange, Oetisheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 16/511,427

(22) Filed: Jul. 15, 2019

(65) Prior Publication Data

US 2019/0341970 A1    Nov. 7, 2019

Related U.S. Application Data

(63) Continuation of application No. 15/882,578, filed on Jan. 29, 2018, now Pat. No. 10,355,753, which is a
(Continued)

(51) Int. Cl.
*H04L 12/46*     (2006.01)
*H04B 7/04*     (2017.01)
(Continued)

(52) U.S. Cl.
CPC ............... *H04B 7/04* (2013.01); *H04L 12/46* (2013.01); *H04L 12/4641* (2013.01);
(Continued)

(58) Field of Classification Search
CPC .. H04B 7/04; H04B 7/02; H04L 12/46; H04L 12/4641; H04L 67/10; H04W 4/06;
(Continued)

(56) References Cited

U.S. PATENT DOCUMENTS 9,397,900 B2    7/2016 Cheng
9,917,622 B2    3/2018 Lange
(Continued)

FOREIGN PATENT DOCUMENTS

EP          2611229 A1    7/2013
WO     2014137347 A1    9/2014
(Continued)

OTHER PUBLICATIONS

International Bureau, "International Preliminary Report on Patentability from PCT Application No. PCT/EP2017/055103 dated Sep. 4, 2018", from Foreign Counterpart to U.S. Appl. No. 15/449,592, pp. 1-7, Published: WO.
(Continued)

*Primary Examiner* — Dac V Ha
(74) *Attorney, Agent, or Firm* — Fogg & Powers LLC

(57) ABSTRACT

One embodiment is directed to a radio access network (RAN) system comprising a baseband unit (BBU), a plurality of remote radio units, wherein each of the remote radio units is located remotely from the BBU, and an intermediary unit The BBU, the remote radio units, and the intermediary unit are communicatively coupled to each other via a switched Ethernet network. The BBU is configured to transmit downlink fronthaul data to the intermediary unit via the switched Ethernet network. The intermediary unit is configured to receive the downlink fronthaul data from the BBU and simulcast the downlink fronthaul data to the remote radio units via the switched Ethernet network. Each remote radio unit is configured to receive the downlink fronthaul data and generate therefrom at least one downlink radio frequency signal for wireless communication to user equipment (UE) via an associated at least one antenna.

42 Claims, 7 Drawing Sheets

Related U.S. Application Data continuation of application No. 15/449,592, filed on Mar. 3, 2017, now Pat. No. 9,917,622.

(60) Provisional application No. 62/302,932, filed on Mar. 3, 2016.

(51) Int. Cl.
   *H04L 29/08* (2006.01)
   *H04W 4/06* (2009.01)
   *H04W 72/04* (2009.01)
   *H04W 88/00* (2009.01)
   *H04W 88/08* (2009.01)

(52) U.S. Cl.
   CPC ............... *H04L 67/10* (2013.01); *H04W 4/06* (2013.01); *H04W 72/0446* (2013.01); *H04W 72/0453* (2013.01); *H04W 88/00* (2013.01); *H04W 88/085* (2013.01)

(58) Field of Classification Search
   CPC ......... H04W 72/0446; H04W 72/0453; H04W 88/00; H04W 88/085
   See application file for complete search history.

(56) References Cited

U.S. PATENT DOCUMENTS

| | | |
|---|---|---|
| 10,355,753 B2 | 7/2019 | Lange |
| 2008/0031263 A1 | 2/2008 | Ervin et al. |
| 2009/0122745 A1 | 5/2009 | Fahldieck |
| 2009/0161669 A1 | 6/2009 | Bragg et al. |
| 2010/0110881 A1 | 5/2010 | Ryoo et al. |
| 2010/0226304 A1 | 9/2010 | Shoji |
| 2012/0014422 A1 | 1/2012 | Wegener |
| 2012/0281700 A1 | 11/2012 | Koganti et al. |
| 2014/0185601 A1 | 7/2014 | Ilyadis |
| 2014/0213285 A1 | 7/2014 | Sauer |
| 2014/0219255 A1 | 8/2014 | Eyuboglu et al. |
| 2014/0314002 A1 | 10/2014 | Hanson et al. |
| 2016/0037550 A1* | 2/2016 | Barabell ........... H04W 72/1263 455/450 |
| 2016/0234832 A1* | 8/2016 | Hebert ................. H04B 1/0475 |
| 2017/0034077 A1 | 2/2017 | Zhao et al. |
| 2017/0155599 A1 | 6/2017 | Vobbilisetty et al. |
| 2018/0013581 A1* | 1/2018 | Fertonani ................ H04L 27/26 |
| 2018/0034669 A1* | 2/2018 | Barbieri .................. H04L 69/04 |
| 2018/0097659 A1* | 4/2018 | Hanson ............... H04W 88/085 |
| 2018/0310207 A1* | 10/2018 | Dahod ............. H04W 36/0055 |
| 2018/0323832 A1* | 11/2018 | Uyehara ................. H04L 69/08 |

FOREIGN PATENT DOCUMENTS

| | | |
|---|---|---|
| WO | 2015191888 A1 | 12/2015 |
| WO | 2016168651 A1 | 10/2016 |

OTHER PUBLICATIONS

International Searching Authority, "International Search Report and Written Opinion from PCT Application No. PCT/EP2017/055103 dated May 19, 2017", from Foreign Counterpart to U.S. Appl. No. 15/449,592, pp. 1-14, Published: WO.

U.S. Patent and Trademark Office, "Notice of Allowance", U.S. Appl. No. 15/449,592, dated Oct. 30, 2017, pp. 1-17, Published: US.

U.S. Patent and Trademark Office, "Notice of Allowance", U.S. Appl. No. 15/882,578, dated Mar. 7, 2019, pp. 1-7, Published: US.

U.S. Patent and Trademark Office, "Office Action", U.S. Appl. No. 15/882,578, dated Sep. 10, 2018, pp. 1-19, Published: US.

European Patent Office, "Communication under Rule 71(3) from EP Application No. 17708787.1", from Foreign Counterpart to U.S. Appl. No. 15/449,592, dated May 11, 2020, pp. 1 through 64, Published: EP.

European Patent Office, "Extended European Search Report from EP Application No. 20199029.8", from Foreign Counterpart to U.S. Appl. No. 15/449,592, dated Jan. 29, 2021, pp. 1 through 7, Published: EP.

* cited by examiner

HYBRID RAN/DIGITAL DAS REPEATER SYSTEM WITH ETHERNET TRANSPORT

CROSS-REFERENCE TO RELATED APPLICATION

This application is a continuation of U.S. patent application Ser. No. 15/882,578, filed on Jan. 29, 2018, which is a continuation of U.S. patent application Ser. No. 15/449,592, filed on Mar. 3, 2017, which claims the benefit of U.S. Provisional Patent Application Ser. No. 62/302,932 filed on Mar. 3, 2016, all of which are hereby incorporated herein by reference.

BACKGROUND

One way that a wireless cellular service provider can improve the coverage provided by a base station or group of base stations is by using a distributed antenna system (DAS). A DAS typically comprises one or more master units and one or more remote units that are communicatively coupled to the master units. One type of DAS is an analog DAS, in which DAS traffic is distributed between the master units and the remote units in analog form. Another type of DAS is a digital DAS, in which DAS traffic is distributed between the master units and the remote units in digital form.

Although ETHERNET technology is widely used in enterprise and telecommunication carrier networks, existing ETHERNET infrastructure has not typically been used in a shared manner for distributing digital DAS traffic among nodes of digital distributed antenna systems. That is, such existing ETHERNET infrastructure has typically not been used to distribute digital DAS traffic among nodes of a digital DAS along with other non-DAS traffic (for example, information technology (IT) traffic or ETHERNET-based radio access network (RAN) traffic).

SUMMARY

One embodiment is directed to a system comprising an end node comprising one or more sink entities for a plurality of streams of digital samples. The digital samples for the plurality of streams are indicative of one or more portions of wireless spectrum in which information is communicated in accordance with one or more wireless air interfaces. The system further comprises a boundary link optimization node. The end node and the boundary link optimizer node are communicatively coupled to an ETHERNET network. The end node is communicatively coupled to the ETHERNET network using a boundary link that is connected to an edge of the ETHERNET network. A virtual local area network (VLAN) is established in the ETHERNET network that includes: a first end point at the edge of the ETHERNET network to which the boundary link is connected and a second end point at the boundary link optimizer node. The boundary link optimizer node is configured to receive ETHERNET packets that include data for the plurality of streams of digital samples, extract the data for the plurality of streams from the received ETHERNET packets, bundle the data for the streams of digital samples, and communicate, to the end node over the VLAN, the bundled data for the streams of digital samples in ETHERNET packets.

Another embodiment is directed to a method of transporting, using an ETHERNET network, a plurality of streams of digital samples to an end node comprising one or more sink entities for the plurality of streams of digital samples. The method comprises receiving, at a boundary link optimizer node communicatively coupled to the ETHERNET network, ETHERNET packets that include data for the plurality of streams of digital samples. The digital samples for the plurality of streams are indicative of one or more portions of wireless spectrum in which information is communicated in accordance with one or more cellular air interfaces. The edge node is communicatively coupled to the ETHERNET network using a boundary link that is connected to an edge of the ETHERNET network. A virtual local area network (VLAN) is established in the ETHERNET network that includes: a first end point at the edge of the ETHERNET network to which the boundary link is connected and a second end point at the boundary link optimizer node. The method further comprises extracting, at the boundary link optimizer node, the data for the plurality of streams from the received ETHERNET packets, bundling, at the boundary link optimizer node, the data for the streams of digital samples, and communicating the bundled data for the streams of digital samples to the edge node in ETHERNET packets from the boundary link optimizer node over the VLAN.

Another embodiment is directed to a boundary link optimizer node to communicate with an end node comprising one or more sink entities for a plurality of streams of digital samples. The digital samples for the plurality of streams are indicative of one or more portions of wireless spectrum in which information is communicated in accordance with one or more cellular air interfaces. The node comprises at least one ETHERNET interface to communicatively couple the boundary link optimizer node to an ETHERNET. The end node is communicatively coupled to the ETHERNET network using a boundary link that is connected to an edge of the ETHERNET network. A virtual local area network (VLAN) is established in the ETHERNET network that includes a first end point at the edge of the ETHERNET network to which the boundary link is connected and a second end point at the boundary link optimizer node. The node further comprises at least one programmable processor configured to execute software. The software is operable to cause the boundary link optimizer node to extract data for the plurality of streams from ETHERNET packets that include data for the plurality of streams of digital samples that are received at the boundary link optimizer node, bundle the data for the streams of digital samples, and communicate the bundled data for the streams of digital samples to the end node in ETHERNET packets over the VLAN.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
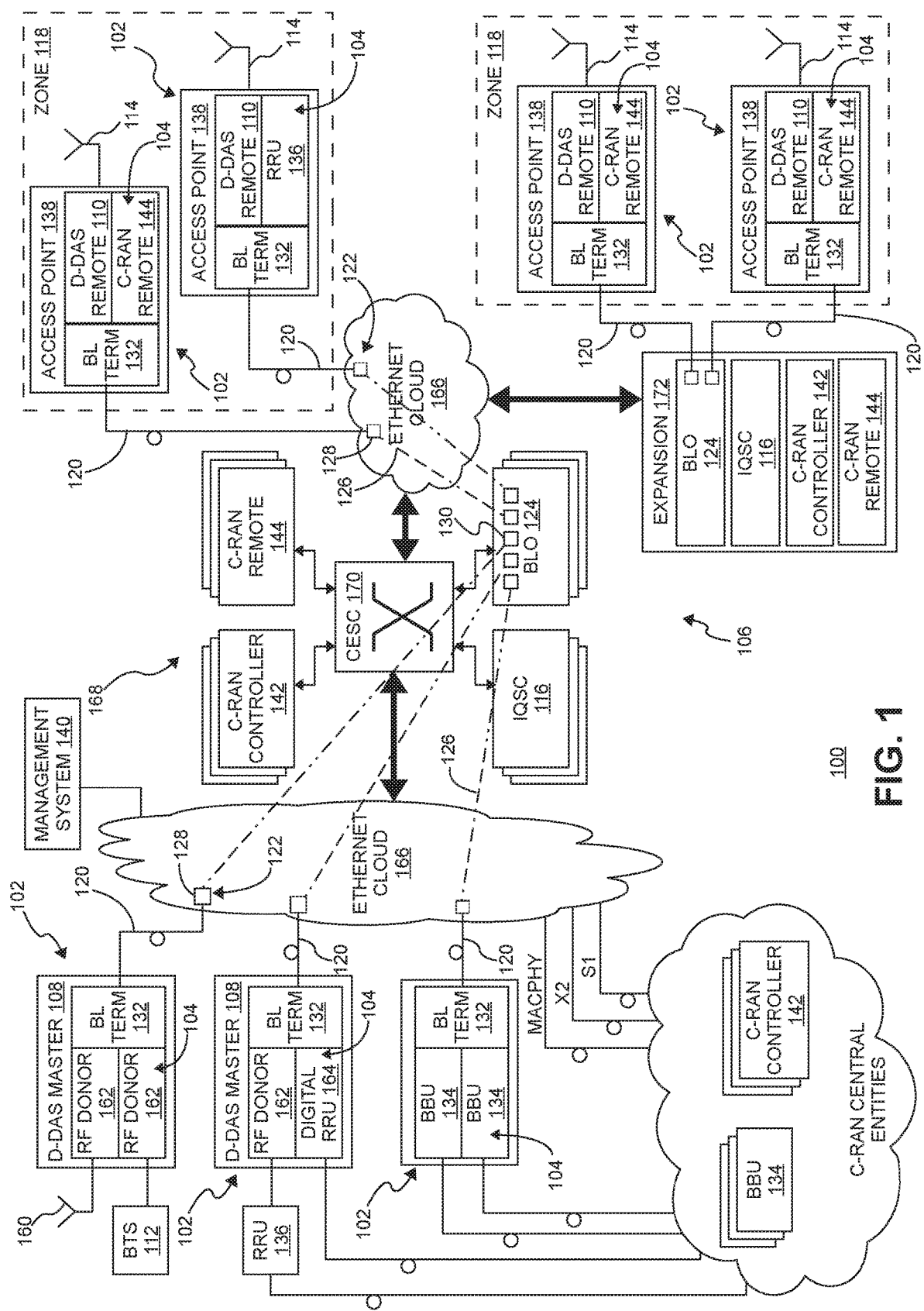
FIG. 1 is a block diagram of one exemplary embodiment of a system for transporting a plurality of serial streams of digital samples from one or more end nodes comprising one or more source entities to one or more other end nodes comprising one or more sink entities using an ETHERNET network.

FIG. 1 is a block diagram of one exemplary embodiment of a system 100 for transporting a plurality of serial streams of digital samples from one or more end nodes 102 comprising one or more source entities 104 to one or more other end nodes 102 comprising one or more sink entities 104 using an ETHERNET network 106. The digital samples for each stream are indicative of a portion of wireless spectrum in which information is communicated in accordance with one or more wireless air interfaces.

In the exemplary embodiment shown in FIG. 1, the system 100 comprises a hybrid radio access network (RAN)/repeater system that uses ETHERNET transport for communications within the system 100. The system 100 is a "hybrid" system in the sense that the system includes both repeater functions (more specifically, distributed antenna system (DAS) repeater functions) that improve wireless coverage and radio access network functions (more specifically, cloud radio access network (C-RAN) functions) that provide additional wireless base station capacity.

In the exemplary embodiment shown in FIG. 1, the digital samples are in the form of digital in-phase (I) and quadrature (Q) samples (though it is to be understood that other embodiments can use other forms of digital samples). Digital IQ samples can be produced from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase and quadrature samples. These digital IQ samples can also be filtered, amplified, attenuated, and/or re-sampled or decimated to a lower sample rate. The digital samples can be produced in other ways. The portion of wireless spectrum can include, for example, a band of wireless spectrum, a sub-band of a given band of wireless spectrum, or an individual wireless carrier. Likewise, an analog wireless signal can be produced from digital IQ samples by digitally up-converting the digital IQ samples to produce real digital samples, performing a digital-to-analog process on the real samples in order to produce an IF or baseband analog signal, and up-convert the IF or baseband analog signal to the desired RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal).

For ease of explanation, in the following description, each stream of digital IQ samples represents a single radio access network carrier (for example, a Universal Mobile Telecommunications System (UMTS) or Long-Term Evolution (LTE) carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

In the system 100, all transport between the various sinks and sources 104 of streams of digital samples deployed within the system 100 is ETHERNET based. Also, the same ETHERNET infrastructure that is used to transport non-DAS traffic (for example, IT traffic or ETHERNET-based RAN traffic) can be used in or with the system 100. In this way, an enterprise's or carrier's existing ETHERNET infrastructure can be used where available to provide front haul transport of streams of digital samples, which can reduce the cost and effort of deploying and maintaining the system 100 (for example, by avoiding the deployment of separate communication infrastructure dedicated to the system 100).

In the exemplary embodiment shown in FIG. 1, some of the end nodes 102 are implemented as digital distributed antenna system (DAS) master units 108 and remote units 110 that use the ETHERNET 106 for front haul transport between the digital DAS master units 108 and the digital DAS remote units 110. In this embodiment, each digital DAS master unit 108 is (or includes) one or more sources and one or more sinks of one or more streams of digitals samples, and each digital DAS remote unit 110 is or includes one or more sources and one or more sinks of one or more streams of digital samples. That is, each digital DAS master unit 108 generates one or more "downstream" streams of digital IQ samples from one or more signals or inputs that are provided to the digital DAS master unit 108 from one or more base stations 112. Each digital DAS remote unit 110 receives one or more of downstream streams of digital IQ samples produced by one or more of the digital DAS master units 108 and generates one or more analog downstream wireless signals that are radiated from one or more antennas 114 that are associated with the digital DAS remote unit 110.

Typically, each downstream stream of digital IQ samples is provided to multiple digital DAS remote units 110 in order to simulcast the generated analog downstream wireless signals from multiple locations. In the exemplary embodiment shown in FIG. 1, the system 100 includes one or more IQ simulcast/combining (IQSC) units 116 that handle the simulcasting of the downstream digital IQ samples to multiple digital DAS remote units 110. In the particular example shown in FIG. 1, the system 100 includes multiple coverage zones 118, where each coverage zone 118 includes one or more digital DAS remote units 110 and where, for each coverage zone 118, downstream digital IQ samples from one or more digital DAS master units 108 are provided to the digital DAS remote units 110 in that coverage zone 118. In the exemplary embodiment shown in FIG. 1, each IQSC unit 116 is assigned to a coverage zone 118 to handle the simulcasting and combining for that coverage zone 118.

Each digital DAS remote unit 110 generates one or more "upstream" streams of digital IQ samples from one or more analog upstream wireless signals received by one or more antennas 114 associated with the digital DAS remote unit 110. Ultimately, each digital DAS master unit 108 receives one or more upstream streams of digital IQ samples. Typically, each upstream stream of digital IQ samples received by a digital DAS master unit 108 is a combined stream created by combining individual upstream streams of digital IQ samples from multiple digital DAS remote units 110 (for example, by digitally summing corresponding IQ samples from each upstream stream). Each digital DAS master unit 108 receives one or more combined upstream streams of digital IQ samples produced by one or more of the digital DAS remote units 110 and generates one or more signals or outputs that are provided from the digital DAS master unit 108 to one or more base stations 112.

In the exemplary embodiment shown in FIG. 1, the combining of digital IQ samples for the upstream streams is performed by the IQSC units 116. More specifically, for each coverage zone 118, the one or more digital DAS remotes units 110 in that coverage zone 118 communicate the digital IQ samples for the upstream streams generated by those digital DAS remote units 108 to the IQSC unit 116 assigned to that coverage zone 118, which digitally combines the corresponding digital IQ samples (for example, by digitally summing corresponding IQ samples from each of the digital DAS remote units 108).

The streams of digital IQ samples that are sent to and received from the sinks and sources 104 must be communicated over the front haul with tight real-time requirements to minimize overall latencies. Historically, such digital IQ samples have been communicated over dedicated, synchronized, serial communication links and not using packetized ETHERNET transport.

As used herein, a "boundary link" 120 refers to an ETHERNET physical link that connects an end node 102 (including a source or sink 104 of digital IQ traffic) to an edge 122 of the ETHERNET network 106. Typically, the boundary link 120 is the only ETHERNET physical link from that end node 102 to the ETHERNET network 106. In order to optimize the use of available bandwidth for transporting digital IQ traffic over the boundary links 120, the ETHERNET network 106 includes a boundary link optimizer (BLO) node 124. A virtual local area network (VLAN) 126 is established in the ETHERNET network 106 for each boundary link 120. Each such VLAN 126 includes only two end points in the ETHERNET network 106—a first end point 128 at the edge 122 of the ETHERNET network 106 to which the boundary link 120 is connected and a second end point 130 at the boundary link optimizer node 124.

In the exemplary embodiment shown FIG. 1, one end of each boundary link 120 is terminated at an edge 122 of the ETHERNET network 106 (for example, at a port of an ETHERNET switch at the edge of the ETHERNET network 106). The other end of each boundary link 120 is terminated at a boundary link termination module 132 that is connected to or included in the associated end node 102 (that includes or is one or more sources and/or sinks 104 of digital IQ traffic).

For traffic that is communicated from an end node 102 to the ETHERNET network 106 over a boundary link 120, the boundary link termination module 132 is configured to receive the one or more streams of digital IQ samples from the one or more sources of the one or more streams of digital IQ samples included in that end node 102, bundle the one or more streams of digital IQ samples, generate ETHERNET packets that include the digital IQ samples for the bundled one or more streams, and communicate the ETHERNET packets to the associated boundary link optimizer node 124 over the boundary link 120 and the VLAN 126 established for it.

These ETHERNET packets (which include the data for digital IQ samples for one or more streams) are also referred to here as "IQ-over-ETHERNET packets" or "IQOE packets."

The boundary link optimizer node 124 is configured to receive the ETHERNET packets (which include digital IQ samples for the bundled one or more streams) from the associated boundary link 120 and extract the digital IQ samples from the received ETHERNET packets. The boundary link optimizer node 124 is configured re-bundle the digital IQ samples for one or more streams to create one or more new bundles of digital IQ sample streams and, for each new bundle, communicate ETHERNET packets that include the digital IQ samples for that new bundle of digital IQ sample streams over the ETHERNET network 106. These new bundles are created based on an intended destination for the bundles.

Also, for traffic that is communicated from the ETHERNET network 106 to an end node 102 over a boundary link 120, the boundary link optimizer node 124 is configured to receive ETHERNET packets from the ETHERNET network 106 that include digital IQ samples for one or more bundles of one or more streams. The boundary link optimizer node 124 is configured to extract the digital IQ samples from the received ETHERNET packets and re-bundle the digital IQ samples for the various streams to create a single bundle of digital IQ samples of streams and communicate ETHERNET packets that include the digital IQ samples for that new single bundle to the associated boundary link termination module 132 over the boundary link 120 and the associated VLAN 126 established for it.

The boundary link termination module 132 is configured to receive the ETHERNET packets (which include digital IQ samples for the bundle of one or more streams) from the associated boundary link 120 and extract the digital IQ samples for the bundle of one or more streams. The boundary link termination module 132 provides the extracted digital IQ samples for the one or more streams to the one or more sinks included in or associated with the end node 102 for that boundary link termination module 132.

Each boundary link optimizer node 124 can be implemented in software executing on one or more suitable programmable processors along with one or more suitable ETHERNET interfaces (for example, on one or more processors of a server computer mounted in a rack with one of the switches used to implement the CESC 170 or on one or more network processors). The boundary link optimizer nodes 124 (or portions thereof) can be implemented in other ways (for example, in a field programmable gate array (FPGA), application specific integrated circuit (ASIC), etc.).

Likewise, each boundary link termination module 132 can be implemented in software executing on one or more suitable programmable processors along with one or more suitable ETHERNET interfaces (for example, on one or more processors of a server computer mounted in a rack with one of the digital DAS master units 108 or digital DAS remote unit 110 or on one or more network processors). The boundary link termination module 132 (or portions thereof) can be implemented in other ways (for example, in a field programmable gate array (FPGA), application specific integrated circuit (ASIC), etc.).

Figure 2:
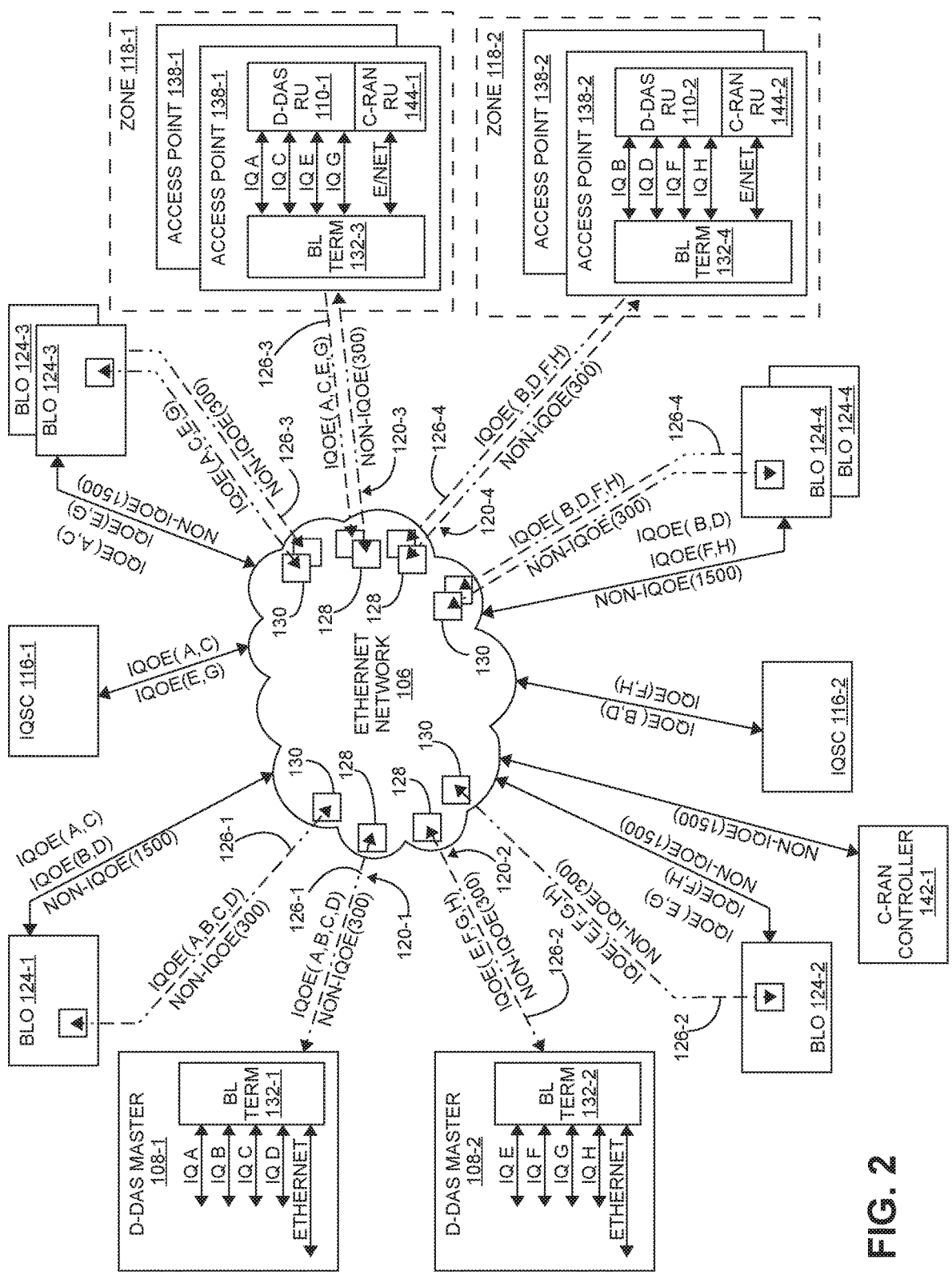
FIG. 2 is a block diagram illustrating one example of the operation of the system shown in FIG. 1.

One example of the operation of the system 100 of FIG. 1 is shown in FIG. 2. In the example shown in FIG. 2, a first digital DAS master unit 108-1 generates four downstream streams of digital IQ samples A, B, C, and D from one or more signals or inputs that are provided to the digital DAS master unit 108-1 from one or more base stations 112. Also, in this example, a second digital DAS master unit 108-2 generates four downstream streams of digital IQ samples E, F, G, and H from one or more signals or inputs that are provided to the digital DAS master unit 108-2 from one or more base stations 112.

In the example shown in FIG. 2, the ETHERNET network 106 is shown in a simplified form for ease of explanation; however, it is to be understood that the ETHERNET network 106 can be implemented as described in more detail below (for example, where the overall ETHERNET network 106 that is used for front haul transport comprises shared portions 166 and dedicated portions 168).

The first digital DAS master unit 108-1 provides the four downstream digital IQ streams A, B, C, and D to a first boundary link termination module 132-1, which receives the four downstream digital IQ streams A, B, C, and D, bundles the four downstream digital IQ streams A, B, C, and D, generates ETHERNET packets that include digital IQ samples for the bundled downstream streams A, B, C, and D, and communicates the ETHERNET packets to a first boundary link optimizer node 124-1 over the VLAN 126-1 established for the associated boundary link 120-1.

The second digital DAS master unit 108-2 provides the four downstream digital IQ streams E, F, G, and H to a second boundary link termination module 132-2, which receives the four downstream digital IQ streams E, F, G, and H, bundles the four downstream digital IQ streams E, F, G, and H, generates ETHERNET packets that include digital IQ samples for the bundled downstream streams E, F, G, and H, and communicates the ETHERNET packets to a second boundary link optimizer node 124-2 over the VLAN 126-2 established for the associated boundary link 120-2.

In this example, downstream streams A, C, E, and G will be radiated in a first coverage zone 118-1, and downstream steams B, D, F, and H will be radiated in a second coverage zone 118-2.

The first boundary link optimizer node 124-1 receives the ETHERNET packets (which include the digital IQ samples for the bundled four downstream streams A, B, C, and D), extracts the digital IQ samples, and re-bundles the digital IQ samples for the four downstream streams A, B, C, and D to create a new bundle for each coverage zone 118 that one of the four downstream streams A, B, C, and D will be radiated in. The first boundary link optimizer node 124-1 re-bundles the digital IQ samples for the four downstream streams A, B, C, and D to create a first bundle that includes digital IQ samples for downstream streams A and C and a second bundle that includes digital IQ samples for downstream streams B and D. The first boundary link optimizer node 124-1 generates ETHERNET packets that include the digital IQ samples for the first bundle of downstream streams A and C and communicates those ETHERNET packets to a first IQSC unit 116-1, which is assigned to the first coverage zone 118-1. Likewise, the first boundary link optimizer node 124-1 generates ETHERNET packets that include the digital IQ samples for the second bundle of downstream streams B and D and communicates those ETHERNET packets to a second IQSC unit 116-2, which is assigned to the second coverage zone 118-2.

The second boundary link optimizer node 124-2 receives the ETHERNET packets (which include the digital IQ samples for the bundled four downstream streams E, F, G, and H), extracts the digital IQ samples, and re-bundles the digital IQ samples for the four downstream streams E, F, G, and H to create a new bundle for each coverage zone 118 that one of the four downstream streams E, F, G, and H will be radiated in. The second boundary link optimizer node 124-2 re-bundles the digital IQ samples for the four downstream streams E, F, G, and H to create a third bundle that includes digital IQ samples for downstream streams E and G and a fourth bundle that includes digital IQ samples for downstream streams F and H. The second boundary link optimizer node 124-2 generates ETHERNET packets that include the digital IQ samples for the third bundle of downstream streams E and G and communicates those ETHERNET packets to the first IQSC unit 116-1, which is assigned to the first coverage zone 118-1. Likewise, the second boundary link optimizer node 124-2 generates ETHERNET packets that include the digital IQ samples for the fourth bundle of downstream streams F and H and communicates those ETHERNET packets to the second IQSC unit 116-2, which is assigned to the second coverage zone 118-2.

In this example, two digital DAS remote units 110-1 are in the first coverage zone 118-1, and two digital DAS remote units 110-2 are in the second coverage zone 118-2. In this particular example, the digital remote units 110-1 and 110-2 are deployed within access points 138-1 and 138-2. The first IQSC unit 116-1 receives the ETHERNET packets that include the digital IQ samples for the first bundle of downstream streams A and C and the ETHERNET packets that include the digital IQ samples for the third bundle of downstream streams E and G, replicates those ETHERNET packets, and sends them to the boundary link optimizer nodes 124-3 associated with the two digital DAS remote units 110-1 in the first coverage zone 118-1. Likewise, the second IQSC unit 116-2 receives the ETHERNET packets that include the digital IQ samples for the second bundle of downstream streams B and D and the ETHERNET packets that include the digital IQ samples for the fourth bundle of downstream streams F and H, replicates those ETHERNET packets, and sends them to the boundary link optimizer nodes 124-4 associated with the two digital DAS remote units 110-2 in the second coverage zone 118-2.

For the two digital DAS remote unit 110-1 in the first coverage area 118-1, the associated boundary link optimizer nodes 124-3 receive the ETHERNET packets that include the digital IQ samples for the first bundle of downstream streams A and C and the ETHERNET packets that include the digital IQ samples for the third bundle of downstream streams E and G that are replicated by the second IQSC unit 116-2. Each of the boundary link optimization nodes 124-3 extracts the digital IQ samples for the first bundle of downstream streams A and C from the respective received ETHERNET packets, extracts the digital IQ samples for the third bundle of downstream streams E and G from the respective received ETHERNET packets, re-bundles the digital IQ samples for the four downstream streams A, C, E, and G to create a single bundle of digital IQ samples for the four downstream streams A, C, E, and G, and generates ETHERNET packets that include the digital IQ samples for that new bundle. Each of the boundary link optimization nodes 124-3 communicates the generated ETHERNET packets to the associated digital DAS remote unit 110-1 (and associated boundary link termination module 132-3) over the respective VLAN 126-3 established for the respective boundary link 120-3.

The boundary link termination modules 132-3 associated with the digital DAS remote units 110-1 in the first coverage area 118-1 receive the ETHERNET packets (which include digital IQ samples for the bundle of downstream streams A, C, E, and G) from the associated boundary links 120-3 and extract the digital IQ samples for the bundle of downstream streams A, C, E, and G. The boundary link termination modules 132-3 provide the extracted digital IQ samples for the downstream streams A, C, E, and G to the digital DAS remote units 110-1. The digital DAS remote units 110-1 generate one or more analog downstream wireless signals from the digital IQ samples for the downstream streams A, C, E, and G and radiate the analog downstream wireless signals from the one or more antennas 114 (not shown in FIG. 2) that are associated with the digital DAS remote units 110-1.

The boundary link termination modules 132-4 associated with the digital DAS remote units 110-2 in the second coverage area 118-2 receive the ETHERNET packets (which include digital IQ samples for the bundle of downstream streams B, D, F, and H) from the associated boundary links 120-4 and extract the digital IQ samples for the bundle of downstream streams B, D, F, and H. The boundary link termination modules 132-4 provide the extracted digital IQ samples for the downstream streams B, D, F, and H to the digital DAS remote units 110-2. The digital DAS remote units 110-2 generate one or more analog downstream wireless signals from the digital IQ samples for the downstream streams B, D, F, and H and radiate the analog downstream wireless signals from the one or more antennas 114 (not shown in in FIG. 2) that are associated with the digital DAS remote units 110-2.

A similar process is performed in the upstream.

In the example shown in FIG. 2, the digital DAS remote units 110-1 in the first coverage area 118-1 generate four upstream streams A, C, E, and G of digital IQ samples from one or more analog upstream wireless signals received by the one or more antennas 114 associated with the digital DAS remote units 110-1. The digital DAS remote units 110-1 provide the four upstream streams A, C, E, and G of digital IQ samples to the associated boundary link termination modules 132-3. The boundary link termination modules 132-3 receive the four upstream streams A, C, E, and G of digital IQ samples, bundle the four upstream streams A, C, E, and G of digital IQ samples, generate ETHERNET packets that include digital IQ samples for the bundled upstream streams A, C, E, and G, and communicate the ETHERNET packets to the associated boundary link optimization nodes 124-3 over the VLANs 126-3 established for the associated boundary links 120-3.

The associated boundary link optimization nodes 124-3 receive the ETHERNET packets (which include the include digital IQ samples for the bundled four upstream streams A, C, E, and G), extract the digital IQ samples, and re-bundles the digital IQ samples for the upstream streams A, C, E, and G to create two new bundles. A new bundle is created for each of the first and second distributed DAS master units 108-1. The boundary link optimization nodes 124-3 re-bundle the digital IQ samples for the four upstream streams A, C, E, and G to create a first bundle that include digital IQ samples for upstream streams A and C (intended for the first distributed DAS master unit 108-1 via the first IQSC unit 116-1) and a second bundle that includes digital IQ samples for upstream streams E and G (intended for the second distributed DAS master unit 108-2 via the first IQSC unit 116-1).

The boundary link optimization nodes 124-3 generate ETHERNET packets that include the digital IQ samples for the first bundle of upstream streams A and C and communicate those ETHERNET packets to the first IQSC unit 116-1, which is assigned to the first coverage zone 118-1. Likewise, the first boundary link optimization nodes 124-3 generate ETHERNET packets that include the digital IQ samples for the second bundle of upstream streams E and G and communicate those ETHERNET packets to the second IQSC unit 116-2, which is assigned to the first coverage zone 118-1.

The digital DAS remote units 110-2 in the second coverage area 118-2 generate four upstream streams B, D, F, and H of digital IQ samples from one or more analog upstream wireless signals received by the one or more antennas 114 associated with the digital DAS remote units 110-2. The digital DAS remote units 110-2 provide the four upstream streams B, D, F, and H of digital IQ samples to the associated boundary link termination modules 132-4. The boundary link termination modules 132-4 receive the four upstream streams B, D, F, and H of digital IQ samples, bundle the four upstream streams B, D, F, and H of digital IQ samples, generate ETHERNET packets that include digital IQ samples for the bundled upstream streams B, D, F, and H, and communicate the ETHERNET packets to the associated boundary link optimization nodes 124-4 over the VLANs 126-4 established for the associated boundary links 120-4.

The associated boundary link optimization nodes 124-4 receive the ETHERNET packets (which include the include digital IQ samples for the bundled four upstream streams B, D, F, and H), extract the digital IQ samples, and re-bundle the digital IQ samples for the upstream streams B, D, F, and H to create two new bundles. A new bundle is created for each of the first and second distributed DAS master units 108-1 and 108-2. The boundary link optimization nodes 124-4 re-bundle the digital IQ samples for the four upstream streams B, D, F, and H to create a third bundle that include digital IQ samples for upstream streams B and D (intended for the first distributed DAS master unit 108-1 via the second IQSC unit 116-2) and a fourth bundle that includes digital IQ samples for upstream streams F and H (intended for the second distributed DAS master unit 108-2 via the second IQSC unit 116-2).

The boundary link optimization nodes 124-4 generate ETHERNET packets that include the digital IQ samples for the third bundle of upstream streams B and D and communicate those ETHERNET packets to the second IQSC unit 116-2, which is assigned to the second coverage zone 118-2. Likewise, the first boundary link optimization nodes 124-4 generate ETHERNET packets that include the digital IQ samples for the fourth bundle of upstream streams F and H and communicate those ETHERNET packets to the second IQSC unit 116-2, which is assigned to the second coverage zone 118-2.

As noted above, each upstream stream of digital IQ samples received by a digital DAS master unit 108 is typically a combined stream created by combining individual upstream streams of digital IQ samples from multiple digital DAS remote units 110. This combining is performed by the IQSC units 116.

In the example shown in FIG. 2, the first IQSC unit 116-1 receives the ETHERNET packets that include the digital IQ samples for the first bundle of upstream streams A and C, digitally combines the corresponding digital IQ samples for each upstream stream A and C (for example, by digitally summing corresponding IQ samples sent from the digital DAS remote units 110-1 in the first coverage zone 118-1), generates ETHERNET packets that include the combined digital IQ samples for the first bundle of upstream streams A and C, and communicates the generated ETHERNET packets to the boundary link optimizer node 124-1 for the first digital DAS master unit 108-1 over the ETHERNET network 106. The first IQSC unit 116-1 also receives the ETHERNET packets that include the digital IQ samples for the second bundle of upstream streams E and G, digitally combines the corresponding digital IQ samples for each upstream stream E and G (for example, by digitally summing corresponding IQ samples sent from the digital DAS remote units 110-1 in the first coverage zone 118-1), generates ETHERNET packets that include the combined digital IQ samples for the second bundle of upstream streams E and G, and communicates the generated ETHERNET packets to the boundary link optimizer node 124-2 for the second digital DAS master unit 108-2 over the ETHERNET network 106.

In the example shown in FIG. 2, the second IQSC unit 116-2 receives the ETHERNET packets that include the digital IQ samples for the third bundle of upstream streams B and D, digitally combines the corresponding digital IQ samples for each upstream stream B and D (for example, by digitally summing corresponding IQ samples sent from the digital DAS remote units 110-2 in the second coverage zone 118-2), generates ETHERNET packets that include the combined digital IQ samples for the third bundle of upstream streams B and D, and communicates the generated ETHERNET packets to the boundary link optimizer node 124-1 for the first digital DAS master unit 108-1 over the ETHERNET network 106. The second IQSC unit 116-2 also receives the ETHERNET packets that include the digital IQ samples for the fourth bundle of upstream streams F and H, digitally combines the corresponding digital IQ samples for each upstream stream F and H (for example, by digitally summing corresponding IQ samples sent from the digital DAS remote units 110-2 in the second coverage zone 118-2), generates ETHERNET packets that include the combined digital IQ samples for the fourth bundle of upstream streams F and H, and communicates the generated ETHERNET packets to the boundary link optimizer node 124-2 for the second digital DAS master unit 108-2 over the ETHERNET network 106.

For the first digital DAS master unit 108-1, the associated boundary link optimizer node 124-1 receives the ETHERNET packets that include the combined digital IQ samples for the first bundle of upstream streams A and C sent from the first IQSC unit 116-1 and the ETHERNET packets that include the combined digital IQ samples for the third bundle of upstream streams B and D sent from the second IQSC unit 116-2.

The boundary link optimizer node 124-1 extracts the digital IQ samples for the first bundle of upstream streams A and C from the respective received ETHERNET packets, extracts the digital IQ samples for the third bundle of upstream streams B and D from the respective received ETHERNET packets, re-bundles the digital IQ samples for the four upstream streams A, B, C, and D to create a single bundle of digital IQ samples for the four upstream streams A, B, C, and D, and generates ETHERNET packets that include the digital IQ samples for that new bundle. The boundary link optimizer node 124-1 communicates the generated ETHERNET packets to the first digital DAS master unit 108-1 (and associated boundary link termination module 132-1) over the respective VLAN 126-1 established for the respective boundary link 120-1.

The boundary link termination module 132-1 associated with the first digital DAS master unit 110-1 receives the ETHERNET packets (which include combined digital IQ samples for the bundle of upstream streams A, B, C, and D) from the associated boundary link 120-1 and extracts the combined digital IQ samples for the bundle of upstream streams A, B, C, and D. The boundary link termination module 132-1 provides the extracted combined digital IQ samples for the upstream streams A, B, C, and D to the first digital DAS master unit 108-1. The first digital DAS master unit 108-1 generates one or more analog upstream wireless signals from the combined digital IQ samples for the upstream streams A, B, C, and D and provides the analog upstream wireless signals to the one or more base stations 112 (not shown in FIG. 2) that are associated with the first digital DAS master unit 108-1.

For the second digital DAS master unit 108-2, the associated boundary link optimizer node 124-2 receives the ETHERNET packets that include the combined digital IQ samples for the second bundle of upstream streams E and G sent from the first IQSC unit 116-1 and the ETHERNET packets that include the combined digital IQ samples for the fourth bundle of upstream streams F and H that are sent from the second IQSC unit 116-2.

The boundary link optimizer node 124-2 extracts the digital IQ samples for the second bundle of upstream streams E and G from the respective received ETHERNET packets, extracts the digital IQ samples for the fourth bundle of upstream streams F and H from the respective received ETHERNET packets, re-bundles the digital IQ samples for the four upstream streams E, F, G, and H to create a single bundle of digital IQ samples for the four upstream streams E, F, G, and H, and generates ETHERNET packets that include the digital IQ samples for that new bundle. The boundary link optimizer node 124-2 communicates the generated ETHERNET packets to the second digital DAS master unit 108-2 (and associated boundary link termination module 132-2) over the respective VLAN 126-2 established for the respective boundary link 120-2.

The boundary link termination module 132-2 associated with the second digital DAS master unit 110-2 receives the ETHERNET packets (which include combined digital IQ samples for the bundle of upstream streams E, F, G, and H) from the associated boundary link 120-2 and extracts the combined digital IQ samples for the bundle of upstream streams E, F, G, and H. The boundary link termination module 132-2 provides the extracted combined digital IQ samples for the upstream streams E, F, G, and H to the second digital DAS master unit 108-2. The second digital DAS master unit 108-2 generates one or more analog upstream wireless signals from the combined digital IQ samples for the upstream streams E, F, G, and H and provides the analog upstream wireless signals to the one or more base stations 112 (not shown in FIG. 2) that are associated with the second digital DAS master unit 108-2.

In general, the boundary link optimization nodes 124 and the boundary link termination modules 132 are used to improve the communication of digital IQ streams over an ETHERNET network 106. Instead of using multiple logical ETHERNET connections for the various streams of digital IQ samples communicated over a boundary link 120 (where the data for each individual stream is packed into separate ETHERNET packets), the data for the various streams of digital IQ samples is bundled together and communicated over the boundary link 120 using a single logical ETHERNET connection (where the data for the various digital IQ streams is bundled together prior to packing the data into ETHERNET packets). This reduces the amount ETHERNET framing overhead used to communicate the streams of digital IQ samples, which increases the amount of usable bandwidth over the boundary link 120.

The preceding description explains how a standard ETHERNET network 106 can be used for front haul transport of streams of digital IQ samples among digital DAS end nodes. These techniques can also be used with other types of end nodes 102 that exchange streams of digital IQ samples. For example, the end nodes 102 of the system 100 can also include or be coupled to radio access network (RAN) end nodes that exchange digital IQ samples. The functions performed by a traditional monolithic base station can be split into central functions performed by a central RAN end node and remote functions performed by one or more remote RAN end nodes. This architecture is also referred to as a "cloud RAN," "centralized RAN," or "C-RAN." The central RAN end nodes are also referred to here as "C-RAN central nodes," and the remote RAN end nodes are also referred to here as "C-RAN remote nodes."

There are several approaches to splitting these functions into central and remote functions. One approach splits the base station functionality into a baseband unit (corresponding to the C-RAN central node) and a remote radio unit (corresponding to a C-RAN remote node), where the front haul between the baseband unit and the remote radio unit uses streams of digital IQ samples. Using digital IQ front haul typically requires a high data rate from the communication links used to implement the front haul. Examples of such an approach are described in the Common Public Radio Interface (CPRI) and Open Base Station Architecture Initiative (OBSAI) families of specifications.

In the exemplary embodiment shown in FIG. 1, the system 100 includes one or more end nodes 102 that comprise RAN baseband units (BBUs) 134 and RAN remote radio unit (RRU) 136 that exchange synchronized serial streams of digital IQ samples over the ETHERNET network 106 using the techniques described above in connection with the digital DAS end nodes 108 and 110. Each such RAN BBU 134 can also use the ETHERNET network 106 (via the public Internet) for backhaul transport to communicate with the associated wireless carrier's core network (not shown in FIG. 1) (for example, using the S1 interface defined by the 3rd Generation Partnership Project (3GPP)) and to communicate with other base station resources (for example, using the X2 interface defined by the 3GPP).

Moreover, in the exemplary embodiment shown in FIG. 1, the system 100 includes at least one access point 138 that includes a digital DAS remote unit 110 and a RAN RRU 136 that are co-located together at the same remote location. In such an access point 138, a single boundary link termination module 132 can be used to communicate streams of digital IQ samples to and from the digital DAS remote unit 110 and to and from the RAN RRU 136 over the same boundary link 120 and associated VLAN 126 and to and from the same boundary link optimizer node 124.

The preceding description describes the transport of serial streams of digital IQ samples over an ETHERNET network using ETHERNET packets. As noted above, these ETHERNET packets are also referred to here as "IQ-over-ETHERNET packets" or "IQOE packets." The boundary link optimization nodes 124 and the boundary link termination modules 132 can also be used to improve the communication of non-IQOE ETHERNET packets over the boundary links 120.

Any non-IQOE packets transmitted over a boundary link 120 (and associated VLAN 126) will increase the transport delay for any IQOE packets that are also communicated over that boundary link 120 (and associated VLAN 126). While it is possible to assign a higher priority to IQOE packets than is assigned to non-IQOE packets, current ETHERNET switches typically are not able to preempt a low priority packet while it is transmitted. This can be an issue for non-IQOE packets that have a relatively large payload size (for example, packets with a payload size of 1500 bytes).

To address this issue, the boundary link optimization nodes 124 and the boundary link termination modules 132 are configured to segment the payloads of non-IQOE packets having a larger payload size into multiple non-IQOE packets having a smaller payload size, if necessary, and interleave the resulting non-IQOE packets with the IQOE packets for communication over the boundary links 120 in a way that satisfies the real-time requirements for the streams of digital IQ samples communicated in the IQOE packets. The payloads of non-IQOE packets having a larger payload size are segmented into multiple non-IQOE packets having a smaller payload size that is sufficiently small to enable the IQOE packets to be communicated in a way that satisfies the real-time requirements for the streams of digital IQ samples communicated in the IQOE packets.

The boundary link optimization nodes 124 and the boundary link termination modules 132 are configured to reassemble the segmented non-IQOE packets (after they are received at the other end of the VLAN 126 established for each boundary link 120) back into non-IQOE packets having a larger payload size for communication over the rest of the ETHERNET network 106. As a result, both non-IQOE packets and IQOE packets can be communicated over boundary links 120 in a way that satisfies the real-time requirements for the streams of digital IQ samples communicated in the IQOE packets.

For example, the non-IQOE packets communicated over the boundary links 120 can include management traffic communicated to and from a management system 140 and/or to and from other end nodes 102.

Other types of non-IQOE packets can be communicated over the boundary links 120. For example, as noted above, the functions performed by a traditional monolithic base station can be split into central functions performed by a C-RAN central node and remote functions performed by one or more C-RAN remote nodes. There are several approaches to splitting these functions into central and remote functions. One approach, described above, splits the base station functionality into a RAN BBU 134 (which corresponds to the C-RAN central node) and a RAN RRU 136 (which corresponds to the C-RAN remote node), where the front haul between the RAN BBU 134 and the RAN RRU 136 uses streams of digital IQ samples. However, using digital IQ front haul typically requires a high data rate from the communication links used to implement the front haul.

A second approach to splitting the base station functions into central and remote functions incorporates the physical layer (PHY) for the cellular air interface into the remote entity, where the front haul between the central entity and the remote entity uses an interface between the media access control (MAC) layer and the PHY layer (also referred to here as a "MACPHY" interface). One example of this approach has been proposed by the Small Cell Forum in connection with the creation of an industry standard called "virtualized Femto Application Programing Interface" (vFAPI). Using this type of MACPHY-based front haul typically requires a much lower data rate from the communication links than is required to implement a digital-IQ-based front haul. The data rate required for a digital-IQ-based front haul can be greater than 10 times the data rate required to implement a MACPHY-based font haul. It is important to note that the MAC and PHY layers previously mentioned in this paragraph are referring to the MAC and PHY layers for the air interface used for wireless communication; it is not referring to the MAC and PHY layers used for front-haul communication.

In a third approach, the central entity comprises a Master eNodeB (MeNB) and the remote entity comprises a Secondary eNodeB (SeNB). This approach was first described in Release 12 of the 3GPP family of specifications. The data rate required to communicate traffic to and from a SeNB is comparable to the data rate required to implement a MACPHY-based front haul.

In the exemplary embodiment shown in FIG. 1, the system 100 includes one or more C-RAN controllers 142 (which corresponds to C-RAN central nodes) and one or more end nodes 102 that comprise one or more C-RAN remote units 144 (which corresponds to C-RAN remote nodes), where the second and third approaches to splitting the base station functions described above are used for front haul transport between the C-RAN controller 142 and C-RAN remote unit 144. That is, either a MACPHY interface or S1/X2 interface is used for such font haul transport, where traffic for such interfaces are communicated over the ETHERNET network 106.

In the exemplary embodiment shown in FIG. 1, the system 100 includes at least one access point 138 that includes a digital DAS remote unit 110 and/or a RAN RRU 136 as well as a C-RAN remote unit 144 that are co-located together at the same remote location. In such an access point 138, a single boundary link termination module 132 can be used to communicate streams of digital IQ samples to and from the digital DAS remote unit 110 and/or the RAN RRU 136 over the boundary link 120 (and associated VLAN 126) using IQOE packets and to communicate MACPHY or S1/X2 interface traffic to and from the C-RAN remote unit 144 over the same boundary link 120 (and associated VLAN 126) using non-IQOE packets. The Transmission Control Protocol (TCP) payload in the ETHERNET packets used for communicating MACPHY and S1/X2 interface traffic typically will have a relatively large Maximum Transmission Unit (MTU) size. The boundary link optimization nodes 124 and the boundary link termination modules 132 can be used to segment the payloads of those non-IQOE packets into multiple non-IQOE packets having a smaller payload size and interleave the resulting non-IQOE packets with the IQOE packets for communication over the boundary links 120 in a way that satisfies the real-time requirements for the streams of digital IQ samples communicated in the IQOE packets.

FIG. 2 also illustrates one example how non-IQOE packets having a larger payload size can be segmented and communicated over a boundary link 120 in the system 100 of FIG. 1 along with IQOE packets. In this example, a C-RAN controller 142-1 communicates front-haul traffic with C-RAN remote units 144-1 included in access points 138-1 in the first zone 118-1. In this example, front-haul traffic is communicated between the C-RAN controller 142-1 and the C-RAN remote units 144-1 using non-IQOE packets over the boundary links 120-3 that couple the access points 138-1 to the rest of the ETHERNET 106. In this example, the access points 138-1 also include a digital DAS remote unit 110-1 to and from which IQOE packets containing digital IQ samples for downstream and upstream streams B, D, F, and H are received and sent over the associated boundary link 120-3 and VLAN 126-3 established for it as described above.

In this example, downstream MACPHY or S1/X2 interface front-haul traffic is communicated to the boundary link optimizer node 124-3 from the C-RAN controller 142-1 over the ETHERNET network 106. This traffic is communicated in non-IQOE packets having a larger payload size of 1500 bytes. The payload sizes used in this example are merely exemplary; other payload sizes can be used. The boundary link optimizer node 124-3 identifies the non-IQOE packets and determines that it is necessary to segment the non-IQOE packets since the non-IQOE packets have a larger payload size. The boundary link optimizer node 124-3 segments the payloads of those non-IQOE packets into multiple non-IQOE packets having a smaller payload size (in this example, five packets having a payload size of 300 bytes). The boundary link optimizer node 124-3 interleaves the resulting non-IQOE packets with downstream IQOE packets for communication over the boundary link 120-3 (and VLAN 126-3 established for it) in a way that satisfies the real-time requirements for the streams B, D, F, and H of digital IQ samples communicated in the IQOE packets. The boundary link termination module 132-3 receives ETHERNET packets from the boundary link 120-3 and identifies non-IQOE packets. The boundary link termination module 132-3 reassembles the segmented downlink non-IQOE packets back into non-IQOE packets having the original larger payload size (that is, having a payload size of 1500 bytes) and provides those downstream non-IQOE packets to the C-RAN remote unit 144-1. As described above, IQOE packets containing digital IQ samples for the downstream streams B, D, F, and H are also provided to the digital DAS remote unit 110-1 as described above.

Similar processing is performed in the upstream. In this example, upstream MACPHY or S1/X2 interface front-haul traffic is sent from each C-RAN remote unit 144-1 in ETHERNET packets having a larger payload size of 1500 bytes. These packets are received at the boundary link termination module 132-3 along with upstream IQOE packets sent from the digital DAS remote unit 110-1. The boundary link termination module 132-3 identifies the non-IQOE packets and determines that it is necessary to segment the non-IQOE packets since the non-IQOE packets have a larger payload size. The boundary link termination module 132-3 segments the payloads of those non-IQOE packets into multiple non-IQOE packets having a smaller payload size (in this example, five packets having a payload size of 300 bytes). The boundary link termination module 132-3 interleaves the resulting non-IQOE packets with upstream IQOE packets for communication over the boundary link 120-3 (and VLAN 126-3 established for it) in a way that satisfies the real-time requirements for the streams B, D, F, and H of digital IQ samples communicated in the IQOE packets. The boundary link optimizer node 124-3 receives ETHERNET packets from the VLAN 126-3 via the boundary link 120-3 and identifies the non-IQOE packets. The boundary link optimizer node 124-3 reassembles the segmented uplink non-IQOE packets back into non-IQOE packets having the original larger payload size (that is, having a payload size of 1500 bytes) and communicate those upstream non-IQOE packets to the C-RAN controller 142-1 over the rest of the ETHERNET network 106.

By segmenting the non-IQOE packets having the larger payload size into non-IQOE packets having a smaller payload size, it is possible to avoid transmitting large non-IQOE packets over the boundary link 120-3, which typically cannot be pre-empted after transmission of those packets has begun. As a result, it is possible to communicate such non-IQOE packets over the boundary link 120-3 in a way that satisfies the real-time requirements for the streams of digital IQ samples communicated in the IQOE packets over the boundary link 120-3.

The system 100 shown in FIG. 1 can be implemented in various ways. For example, as noted above, each digital DAS master unit 108 is communicatively coupled to one or more base stations 112. One or more of the base stations 112 can be co-located with the respective master unit 108 to which it is coupled (for example, where the base station 112 is dedicated to providing base station capacity to the system 100). Also, one or more of the base stations 112 can be located remotely from the respective master unit 108 to which it is coupled (for example, where the base station 112 is a macro base station that is providing base station capacity to a macro cellular network in addition to providing capacity to the system 100). In this latter case, a master unit 108 can be coupled to a donor antenna 160 in order to wirelessly communicate with the remotely located base station 112.

Also, as noted above, the base stations 112 can be implemented as a traditional monolithic base station or using a distributed base station architecture.

The digital DAS master units 108 can be configured to use wideband interfaces or narrowband interfaces to the base stations 112. Also, the master units 108 can be configured to interface with the base stations 112 using analog radio frequency (RF) interfaces or digital interfaces (for example, a digital IQ interface).

In the exemplary embodiment shown in FIG. 1, one or more of the digital DAS master units 108 includes an RF donor card 162 in order to interface with one or more base stations 112 using an analog RF interface (for example, either a traditional monolithic base station or via the analog RF interface of an RRU 136). The base stations 112 can be coupled to the RF donor cards 162 using a network of attenuators, combiners, splitters, amplifiers, filters, cross-connects, etc., (sometimes referred to collectively as a "point-of-interface" or "POI"). This is done so that, in the downstream, the desired set of RF carriers output by the base stations 112 can be extracted, combined, and routed to the appropriate RF donor card 162, and so that, in the upstream, the desired set of carriers output by the RF donor cards 162 can be extracted, combined, and routed to the appropriate interface of each base station 112. It is to be understood, however, that this is one example and that other embodiments can be implemented in other ways.

In the downstream, each RF donor card 162 generates one or more downstream streams of digital IQ samples from each analog downstream RF input it receives from the base stations 112. In the upstream, each RF donor card 122 receives upstream streams of combined digital IQ samples communicated from one or more digital DAS remote units 110 and generates an appropriate analog upstream RF output.

In the exemplary embodiment shown in FIG. 1, one or more of the digital DAS master units 108 includes a digital RRU card 164 in order to interface with one or more base stations 112 using a digital interface. In this example, the digital RRU card 164 is used to interact directly with one or more RAN BBUs 134 using the digital IQ interface that is used for communicating between the BBUs 134 and RRUs 136 (for example, using the CPRI serial digital IQ interface).

In the downstream, each digital RRU card 164 terminates one or more downstream streams of digital IQ samples provided to it from one or more BBUs 134 and, if necessary, converts (by re-sampling, synchronizing, combining, separating, gain adjusting, etc.) them into downstream streams of digital IQ samples compatible with the digital DAS remote units 110 used in the system 100. In the upstream, each digital RRU card 164 receives upstream streams of combined digital IQ samples communicated from one or more digital DAS remote units 110 and, if necessary, converts (by re-sampling, synchronizing, combining, separating, gain adjusting, etc.) them into upstream streams of digital IQ samples compatible with the one or more BBUs 134 that are coupled to that digital RRU card 164.

The digital DAS master units 108 can be implemented in other ways.

In the exemplary embodiment shown in FIG. 1, the overall ETHERNET network 106 that is used for front haul transport in the network 100 comprises shared portions 166 and dedicated portions 168. The shared portions 166 include, for example, devices deployed in an enterprise's network such as ETHERNET edge routers, ETHERNET aggregation routers, and access routers that couple the enterprise's network to a carrier's network using one or more access technologies (such as Gigabit ETHERNET passive optical networks (GPON), various types of digital subscriber line (xDSL) links, microwave wireless links, etc.). The shared portions 166 also include devices deployed in a carrier's network such devices in the the access network used to couple the enterprise network to the public Internet or a wireless carrier's core network, edge and aggregation routers used in such networks, and any DAS master units 108, RAN BBUs 134, or RAN controllers 142 located in a wireless carrier's network or at a carrier-controlled location (for example, at macro base station location). In FIG. 1, the various shared portions 166 of the larger ETHERNET network 106 are shown and referred to here as "ETHERNET clouds" 166.

The dedicated portions 168 of the overall ETHERNET network 106 are "dedicated" in the sense that they are primarily deployed and used for DAS and RAN traffic. In the exemplary embodiment shown in FIG. 1, the dedicated portions 168 include a packet switch cluster 170. The packet switch cluster 170 comprises a set of one or more switches or switch devices having a common broadcast domain. Any device that is directly connected to the packet switch cluster 170 can reach any other device that is directly connected to the packet switch cluster 170 at Layer 2 of the Open Systems Interconnection (OSI) model.

The packet switch cluster 170 is described here in connection with the exemplary embodiment shown in FIG. 1 as being implemented using ETHERNET switches and is also referred to here as an "ETHERNET switch cluster" 170, "central ETHERNET switch cluster 170," or "CESC 170." In the exemplary embodiment shown in FIG. 1, the switches used to implement the CESC 170 include high bandwidth ports—for example, ports having a bandwidth of 100 Gigabits per second (Gbps)—that are used for providing interconnects towards the sources or sinks of digital IQ traffic.

Although the packet switch cluster 170 is described here in connection with the exemplary embodiment shown in FIG. 1 as being implemented using ETHERNET switches, it is to be understood that the packet switch cluster 170 can be implemented in other ways. For example, although the packet switch cluster 170 will send and receive ETHERNET traffic on its ingress and egress ports, the switch technology and devices used to implement the packet switch cluster 170 need not only include true ETHERNET switch technology and devices and may include other packet switching technology and devices (such as Peripheral Component Interconnect Express (PCI-E), Serial RapidIO (SRIO), and Multiprotocol Label Switching (MPLS) technology and devices).

In the exemplary embodiment shown in FIG. 1, multiple boundary link optimization nodes 124 and IQSC units 116 are directly connected to ports of the CESC 170 and can reach, and be reached by, other devices that are also directly connected to the CESC 170 at Layer 2 of the OSI model. Also, in this exemplary embodiment, one or more C-RAN controllers 142 and C-RAN remote units 144 are directly connected to the CESC 170 and can reach, and be reached by, other devices that are also directly connected to the CESC 170 at Layer 2 of the OSI model.

The boundary link optimization nodes 124 can be deployed elsewhere in the system 100. For example, as shown in FIG. 1, one or more boundary link optimization nodes 124 can be deployed in or with an expansion node 172 in order to terminate one or more boundary links 120 that are connected to one or more access points 138 (each having a boundary link termination module 132 for terminating the other end of the respective boundary link 120). Also, one or more IQSC units 116, C-RAN controllers 142, and C-RAN remote units 144 can be deployed in or with an expansion node 172. In this example, the one or more boundary link optimization nodes 124, IQSC units 116, C-RAN controllers 142, and C-RAN remote units 144 can be coupled to the CESC 170 via an ETHERNET cloud 168.

The system 100 comprises a management system 140 that can be used to manage the elements of the system 100. For example, the management system 140 can be used to configure the VLANs 126, the boundary link termination modules 132 and the boundary link optimization nodes 124 (for example, configuring which streams of digital samples are bundled and unbundled and the destinations for the ETHERNET packets sent from those nodes), and the IQSC units 116 (for example, configuring which streams to replicate and combine and the destinations for the ETHERNET packets sent from those nodes). In the exemplary embodiment shown in FIG. 1, the management system 140 communicates with the various elements of the system 100 using the ETHERNET network 106. Also, in some implementations, the management system 140 sends and receives management communications to and from the digital DAS master units 108 and the C-RAN central nodes, each of which in turn forwards relevant management communications to and from the digital DAS remote units 110 and the C-RAN remote units, respectively.

Figure 3:
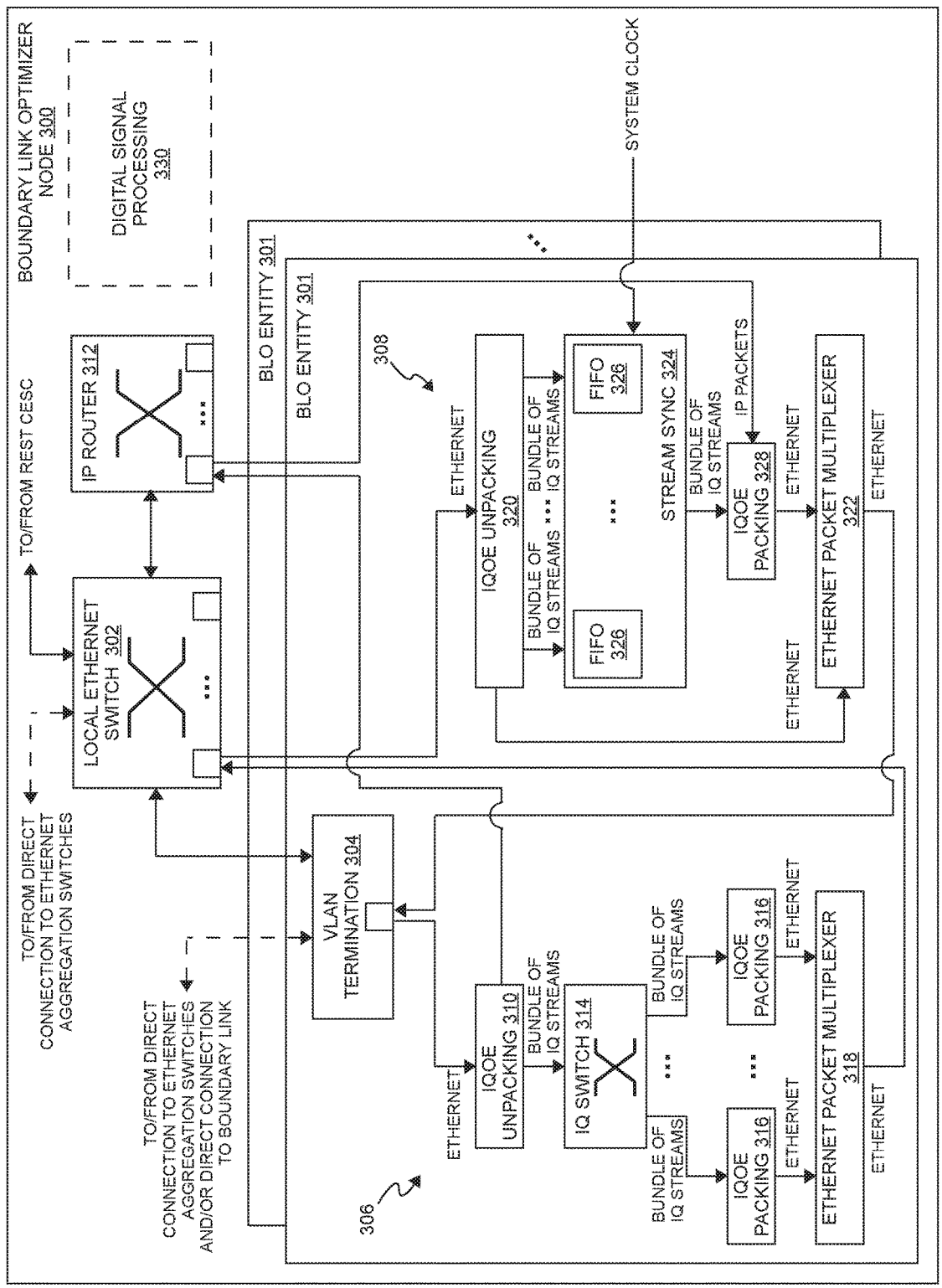
FIG. 3 is a block diagram illustrating one exemplary embodiment of a boundary link optimizer node suitable for use in the system of FIG. 1.

FIG. 3 is a block diagram illustrating one exemplary embodiment of a boundary link optimizer (BLO) node 300 suitable for use in the system 100 of FIG. 1.

Each boundary link optimizer node 300 can be implemented in software executing on one or more suitable programmable processors along with one or more suitable ETHERNET interfaces (for example, on one or more processors of a server computer mounted in a rack with one of the ETHERNET switches used to implement the CESC 170 or on one or more network processors). The boundary link optimizer nodes 300 (or portions thereof) can be implemented in other ways (for example, in a field programmable gate array (FPGA), application specific integrated circuit (ASIC), etc.).

The BLO node 300 shown in FIG. 3 includes (or is coupled to) a local ETHERNET switch 302. The local ETHERNET switch 302 is configured to be a part of the central ETHERNET switch cluster 170 (shown in FIG. 1) and is connected to the rest of CESC 170 by a high bandwidth port (for example, a 100 Gbps port).

In the exemplary embodiment shown in FIG. 3, each BLO node 300 implements one or more BLO entities 301. In one example, a BLO node 300 includes 40 BLO entities 301, each of which supports 1 Gbps, where the local switch 302 of that BLO node 300 is connected to the rest of the CESC 170 via a 100 Gbps port. In another example, a BLO node 300 includes 4 BLO entities 301, each of which supports 10 Gbps, where the local switch 302 of that node 300 is also connected to the rest of the CESC 170 via a 100 Gbps port.

In some embodiments, the local ETHERNET switch 302 in each BLO node 300 includes a direct connection to one or more ETHERNET aggregation switches in the ETHERNET clouds 168 (in which case traffic for more than one VLAN might travel over a single physical connection used to implement such a direction connection). This direct connection enables traffic that is coming from or going to such ETHERNET aggregation switches to be directly routed from or to the ETHERNET switch 302 in that BLO node 300 without having to first pass through the rest of the CESC 170.

As noted above, each BLO node 300 implements one or more BLO entities 301. Each BLO entity 301 comprises a respective VLAN termination block 304 that, if necessary, adds an appropriate VLAN tagged header to all VLAN ETHERNET packets sent from that BLO entity 301 and removes the VLAN tagged headers from VLAN ETHERNET packets received at that BLO entity 301. Each VLAN termination block 304 is connected to the local ETHERNET switch 302 in the BLO node 300 and sends and receives ETHERNET packets to and from the switch 302. In some embodiments, one or more of the VLAN termination blocks 304 have a local breakout to one or more ETHERNET aggregation switches in the ETHERNET clouds 168. This local break out enables traffic that is coming from or going to such ETHERNET aggregation switches to be directly routed from or to the VLAN termination block 304 without having to first pass through the rest of the CESC 170.

Also, in some embodiments, one or more of the VLAN termination blocks 304 have a direct connection to the associated boundary link 120. This direct connection to the associated boundary link 120 also enables traffic that is coming from or going to such boundary link 120 to be directly routed from or to the VLAN termination block 304 without having to first pass through the rest of the CESC 170.

Each BLO entity 301 in the BLO node 300 includes an ingress communication path 306 and an egress communication path 308. The ingress communication path 306 deals with in-bound ETHERNET packets that were sent on the associated boundary link 120 by a source of digital IQ traffic, and the egress communication path 308 deals with out-bound ETHERNET packets to be sent on the associated boundary link 120 to a sink of digital IQ traffic.

Each ingress communication path 306 includes an ingress digital-IQ-traffic-over-ETHERNET (IQOE) unpacking function 310 that is communicatively coupled to the associated VLAN termination block 304. In-bound ETHERNET packets received at the VLAN termination block 304 are provided to the ingress IQOE unpacking function 310. Each ingress IQOE unpacking function 310 parses the received packets at the IP level (that is, at Layer 3 of the OSI model) to determine if each packet contains digital IQ samples (that is, is an IQOE packet). Received ETHERNET packets that are non-IQOE packets are forwarded to an IP router 312 that is included in, or is coupled to, the BLO node 300. These non-IQOE packets are handled by the IP router 312 (that is, at Layer 3 of the OSI model). For example, the IP router 312 may aggregate the payloads from several in-bound non-IQOE packets that have a small maximum transmission unit (MTU) size (for example, as a result of the segmentation processing performed in the associated boundary link termination module 132 described above) to form packets having a larger MTU size more appropriate for standard ETHERNET transmission (for example, a MTU size of 1500 bytes). The IP router 312 then forwards these aggregated ETHERNET packets to the local ETHERNET switch 302 for forwarding onto the rest of the CESC 170.

For received ETHERNET packets that are IQOE packets, the ingress IQOE unpacking function 310 extracts the payloads from those IQOE packets, which comprises data for a bundle of digital IQ streams. The extracted data for a bundle of digital IQ streams is provided to an IQ switch function 314 included in each BLO entity 301, which separates the data into separate data for the individual digital IQ streams. The IQ switch function 314 then re-bundles the individual digital IQ streams into one or more new bundles of digital IQ streams and outputs each new bundle of digital IQ streams to a respective ingress IQOE packing function 316 included in each BLO entity 301. These new bundles are created based on an intended destination for the bundles. The intended destination is an entity that is directly connected to the CESC 170. For example, the intended destination for the re-bundled downstream digital IQ streams originally sourced from a digital DAS master unit 108 typically will be one or more IQSC units 116 that handle the simulcasting of the digital IQ streams. Likewise, the intended destination for the re-bundled upstream digital IQ streams originally sourced from a digital DAS remote unit 110 typically will be one or more IQSC units 116 that handle the combining of those digital streams with digital streams received from one or more other digital DAS remote units 110.

Each ingress IQOE packing function 316 packs the various bundles of digital IQ streams provided to it into separate ETHERNET packets. The ingress IQOE packing function 316 adds an appropriate ETHERNET header to each ETHERNET packet having as its destination MAC address the MAC address of the intended destination for the packet (typically an IQSC unit 116). The management system 140 can be used to configure the various components of the BLO entity 301 in order to address the ETHERNET packets to the intended destination.

All of the ingress IQOE packing functions 316 in a given BLO entity 301 output their ETHERNET packets to a common ingress ETHERNET packet multiplexing function 318 included in that BLO entity 301. The ingress ETHERNET packet multiplexing function 318 in each BLO entity 301 forwards the ETHERNET packets it receives to the local ETHERNET switch 302 for forwarding onto the rest of the CESC 170 and, ultimately, to an entity attached to the CESC 170 (for example, an IQSC unit 116). Each ingress ETHERNET packet multiplexing function 318 forwards the ETHERNET packets it receives in accordance with a schedule or policy that ensures that the packets for the various bundles of digital IQ streams are forwarded in a timely manner (for example, a using schedule that ensures that all bundles have an equal amount packets forwarded during any given schedule period). In one implementation, the ingress ETHERNET packet multiplexing function 318 is implemented using an ETHERNET switch.

Each egress communication path 308 includes an egress IQOE unpacking function 320 that is communicatively coupled to the local ETHERNET switch 302 to receive ETHERNET packets from entities connected to the CESC 170 (for example, IQSC units 116). Out-bound ETHERNET packets received from the local switch 302 are provided to the egress IQOE unpacking function 320. The egress IQOE unpacking function 320 parses the received packets at the IP level (that is, at Layer 3 of the OSI model) to determine if each packet is an IQOE packet. Received ETHERNET packets that are non-IQOE packets are directly forwarded to an egress ETHERNET packet multiplexer function 322 included in each BLO entity 301.

For received ETHERNET packets that are IQOE packets, the egress IQOE unpacking function 320 extracts the payloads from those IQOE packets, which comprise data for a bundle of digital IQ streams. The egress path 308 for each BLO entity 301 is configured to process IQOE packets for one or more different bundles of digital IQ streams, where each IQOE packet contains data for one such bundle. The egress path 308 contains a stream synchronization (SYNCH) function 324 that includes a separate first-in-first-out (FIFO) queue 326 for each different bundle of digital IQ streams processed in that egress path 308. Each such FIFO queue 326 has a shallow depth.

For each IQOE packet, the egress IQOE unpacking function 320 extracts the payload from that IQOE packet and outputs the extracted data to the FIFO queue 326 that handles the bundle of digital IQ streams contained in that IQOE packet. The stream SYNCH function 324 supervises the relative arrival times of the various IQOE packets versus the overall system clock and creates statistics for their "time of arrival." Based on these time of arrival statistics, the source entities for each stream can be instructed to advance or delay the transmission of that stream. This transmission adjustment can be made manually (for example, using the management system 140 when the system 100 is provisioned) or automatically (for example, where such adjustments are automatically made on a periodic basis). Also, in the case of an overflow or an underflow of a particular FIFO queue 324, data from one or more of the associated IQOE packets are dropped or dummy data is added to the queue 324, respectively. All of this is done in order to maintain synchronization of the various bundles of digital IQ streams handled by the various FIFO queues 326.

The stream SYNCH function 324 is triggered by the overall system clock to output data from each FIFO queue 326. The stream SYNCH function 324 bundles the output data together into a single bundle of digital IQ streams and outputs it to an egress IQOE packing function 328 included in each BLO entity 301. The egress IQOE packing function 328 adds an appropriate ETHERNET header to each ETHERNET packet having as its destination MAC address the MAC address of the boundary link termination module 132 at the other end of the VLAN established for the associated boundary link 120. The management system 140 can be used to configure the various components of each boundary link entity 301 in order to address the ETHERNET packets to the intended destination. The resulting ETHERNET packet is forwarded to the egress ETHERNET packet multiplexer function 322 for that BLO entity 301.

Also, the IP router 312 in each BLO module 301 receives non-IQOE ETHERNET packets from the CESC 170 that are destined for a sink entity coupled to the associated boundary link 120. These ETHERNET packets may have any MTU size (for example, a MTU size of 1500 bytes). For any such non-IQOE ETHERNET packet destined for the sink entity coupled to the associated boundary link 120, the IP router 312 is configured to forward ETHERNET frames containing segments of the payload from that packet to the egress IQOE packing function 328 for that BLO entity 301. The forwarded ETHERNET frames have an appropriate MTU size. This MTU size is determined based on the expected gap between subsequent IQOE packets. The egress IQOE packing function 328 adds an appropriate header to the ETHERNET frames and forwards the resulting ETHERNET packet to the egress ETHERNET packet multiplexer function 322 for that BLO entity 301.

The egress ETHERNET packet multiplexer function 322 for each BLO entity 301 forwards the various types of ETHERNET packets it receives to the VLAN termination block 304 for that BLO entity 301, and, ultimately, to a sink entity at the other end of the VLAN established for the associated boundary link 120 (for example, an access point 138). Each egress ETHERNET packet multiplexing function 322 forwards the ETHERNET packets it receives in accordance with a schedule or policy that ensures that the packets for the various bundles of digital IQ streams are forwarded in a timely manner (for example, a using schedule that ensures no more than a single ETHERNET packet that originated from the IP router 312 (which contains a segment of a larger packet) is forwarded during each schedule period). In one implementation, each egress ETHERNET packet multiplexing function 322 is implemented using an ETHERNET switch.

Also, in some implementations, the BLO node 300 includes digital signal processing (DSP) functionality 330 that can be used to implement one or more signal processing functions that operate on one or more of the digital IQ streams that are processed by the BLO node 300. Examples of such signal processing functions include compression, decompression, crest factor reduction, and sample rate changes. Other signal processing functions can be implemented. Although a single DSP block is shown in FIG. 3, it should be understood that multiple instances of DSP functionality can be used and DSP functionality can be integrated into one or more of the BLO entities 301 shown in FIG. 3.

Figure 4:
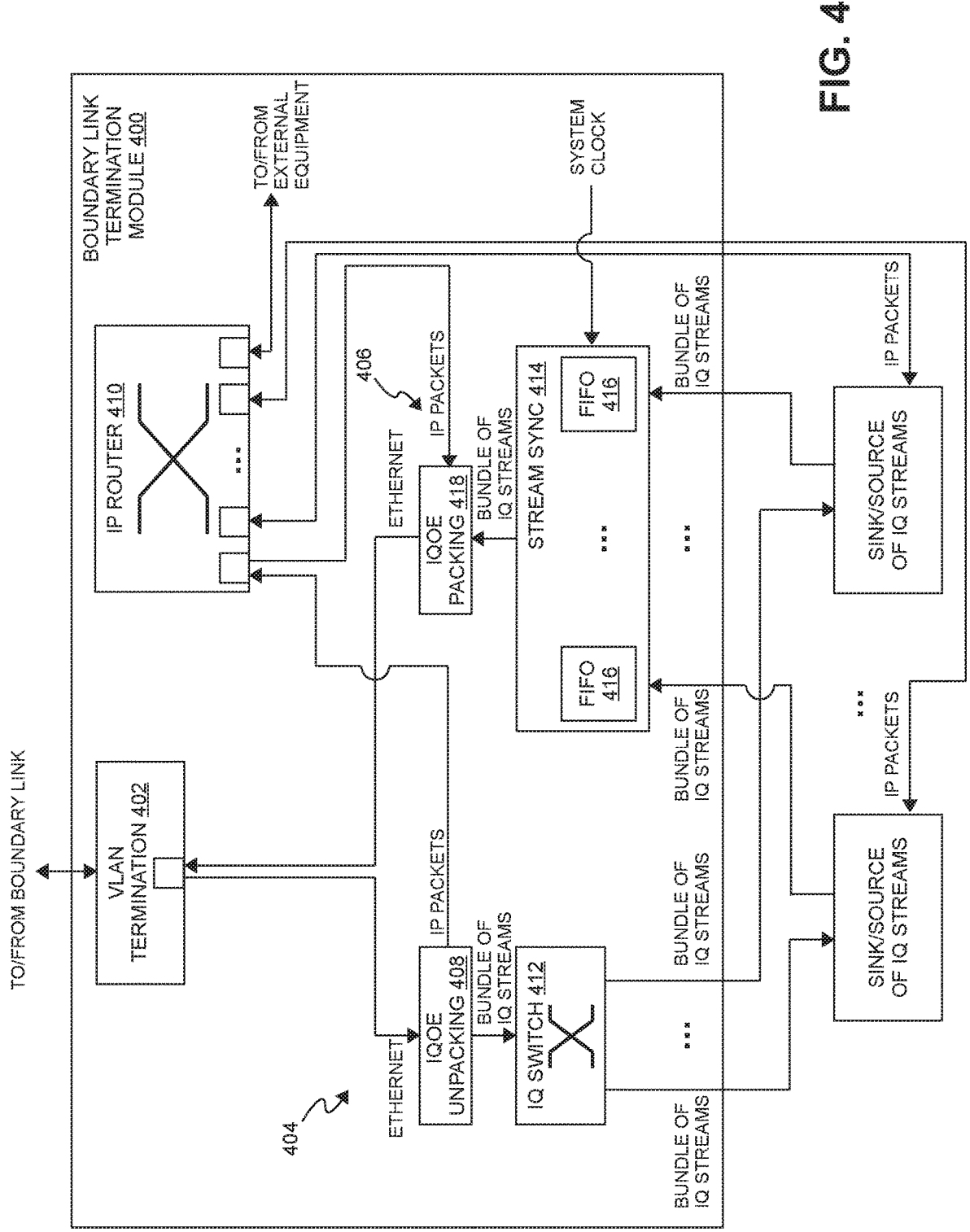
FIG. 4 is a block diagram illustrating one exemplary embodiment of a boundary link termination module suitable for use in the system of FIG. 1.

FIG. 4 is a block diagram illustrating one exemplary embodiment of a boundary link termination module 400 suitable for use in the system 100 of FIG. 1.

Each boundary link termination module 400 can be implemented in software executing on one or more suitable programmable processors along with one or more suitable ETHERNET interfaces (for example, on one or more processors of a server computer mounted in a rack with one of the digital DAS master units 108 or digital DAS remote unit 110 or on one or more network processors). The boundary link termination module 400 (or portions thereof) can be implemented in other ways (for example, in a field programmable gate array (FPGA), application specific integrated circuit (ASIC), etc.).

Each boundary link termination module 400 comprises a respective VLAN termination block 402 that, if necessary, adds an appropriate VLAN tagged header to all VLAN ETHERNET packets sent from that boundary link termination module 400 and removes the VLAN tagged headers from VLAN ETHERNET packets received at that boundary link termination module 400. Each VLAN termination block 402 is connected to the boundary link 120 that is terminated at that boundary link termination module 400.

Each boundary link termination module 400 includes an ingress communication path 404 and an egress communication path 406. The ingress communication path 404 deals with in-bound ETHERNET packets received from the associated boundary link 120 that were forwarded on that boundary link 120 by the boundary link optimizer node 124 at the other end of the VLAN 126 established for the boundary link 120. The egress communication path 406 deals with out-bound ETHERNET packets for the associated boundary link 120 that are destined for the boundary link optimizer node 124 at the other end of the VLAN 126 established for the boundary link 120.

Each ingress communication path 404 includes an IQOE unpacking function 408 that is communicatively coupled to the associated VLAN termination block 402. In-bound ETHERNET packets received at the VLAN termination 402 are provided to the IQOE unpacking function 408. The IQOE unpacking function 408 parses the received packets at the IP level (that is, at Layer 3 of the OSI model) to determine if each packet is an IQOE packet. Received ETHERNET packets that are non-IQOE packets are forwarded to an IP router 410 that is included in, or is associated with, the boundary link termination module 400. These non-IQOE packets are handled by the IP router 410 (that is, at Layer 3 of the OSI model). For example, the IP router 410 may aggregate the payloads from several in-bound non-IQOE packets that have a small maximum transmission unit (MTU) size (for example, as a result of the segment processing performed in the boundary link optimizer node 124 described above). This is done to form packets having a larger MTU size more appropriate for standard ETHERNET transmission (for example, a MTU size of 1500 bytes). The IP router 410 then forwards these aggregated ETHERNET packets to a sink entity or to external equipment.

For received ETHERNET packets that are IQOE packets, the IQOE unpacking function 408 extracts the payloads from those IQOE packets, which comprise data for a bundle of digital IQ streams. The extracted data for a bundle of digital IQ streams is provided to an IQ switch function 412 included in each boundary link termination module 400, which separates the data into separate data for the individual digital IQ streams. The IQ switch function 412 then re-bundles the individual digital IQ streams into one or more new bundles of digital IQ streams and outputs each new bundle of digital IQ streams to a respective sink entity for those digital IQ streams. These new bundles are created and output by the IQ switch function 412 based on the intended sink entity for the bundles. Each such sink entity processes the digital IQ streams as described above. The management system 140 can be used to configure the various components of the boundary link termination module 400 in order to direct the various digital IQ streams to the intended sink entity.

The egress path 406 in each boundary termination link module 400 contains a stream synchronization (SYNCH) function 414 that includes a separate first-in-first-out (FIFO) queue 416 for each different bundle of upstream digital IQ streams output by the source entities. Each such FIFO queue 416 has a shallow depth.

For each source entity associated with the boundary link termination module 400, the source entity outputs a bundle of upstream digital IQ streams to the particular FIFO queue 416 assigned to that source entity. The stream SYNCH function 414 supervises the relative arrival times of the various packets versus the overall system clock and creates statistics for their time of arrival. Based on these time of arrival statistics, the source entities for each stream can be instructed to advance or delay the transmission of that stream. This transmission adjustment can be made manually (for example, using the management system 140 when the system 100 is provisioned) or automatically (for example, where such adjustments are automatically made on a periodic basis). Also, in the case of an overflow or an underflow of a particular FIFO queue 416, data can be dropped or dummy data can be added to the queue 416, respectively. All of this is done in order to maintain synchronization of the various bundles of digital IQ streams handled by the various FIFO queues 416.

The stream SYNCH function 414 is triggered by the overall system clock to output data from each FIFO queue 416. The stream SYNCH function 414 bundles the data together into a single bundle of digital IQ streams and outputs the bundle to an IQOE packing function 418 included in the boundary link termination module 400. The IQOE packing function 418 packs the data output from the FIFO queues 416 into ETHERNET packets (specifically, IQOE packets). The IQOE packing function 418 adds an appropriate ETHERNET header to each ETHERNET packet having as its destination MAC address the MAC address of the VLAN termination block 304 at the other end of the VLAN established for the associated boundary link 120. The management system 140 can be used to configure the various components of the boundary link termination module 400 in order to address the ETHERNET packets to the intended destination. The resulting ETHERNET packet is forwarded to to the VLAN termination block 402 for sending over the VLAN 126 established for the associated boundary link 120.

Also, the IP router 410 in each boundary link termination module 400 receives non-IQOE ETHERNET packets from the source or sink entities associated with that boundary link termination module 400 or from external equipment associated with that boundary link termination module 400. These ETHERNET packets may have any MTU size (for example, a MTU size of 1500 bytes). For any such non-IQOE ETHERNET packet, the IP router 410 is configured to forward ETHERNET frames containing segments of data from that packet to the IQOE packing function 418. The forwarded ETHERNET frames have an appropriate MTU size. This MTU size is determined based on the expected gap between subsequent IQOE packets output by the IQOE packing function 418. The IQOE packing function 418 adds an appropriate header to the ETHERNET frames and forwards the resulting ETHERNET packet to the VLAN termination block 402 for sending over the VLAN 126 established for the associated boundary link 120.

Figure 5:
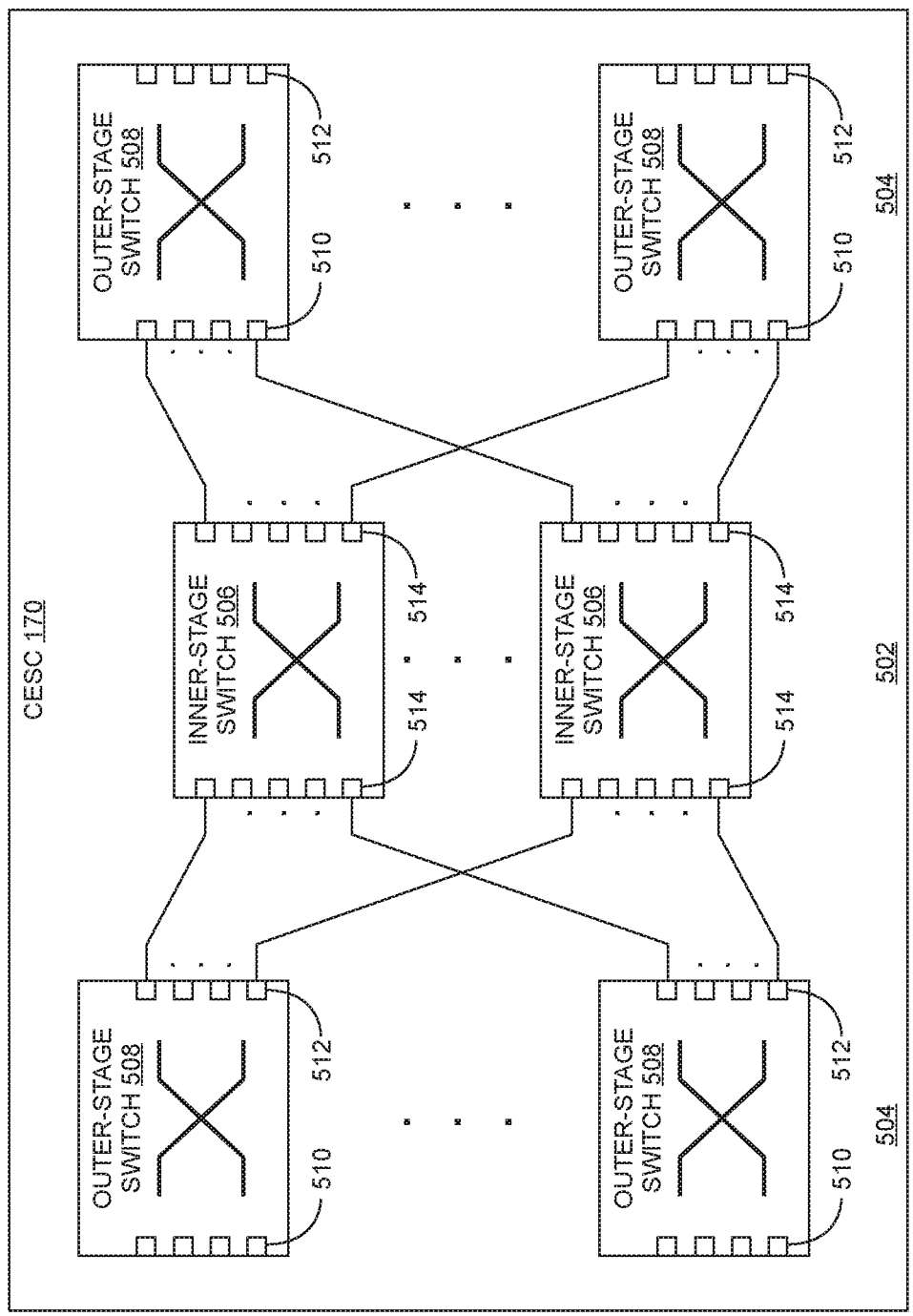
FIG. 5 is a block diagram illustrating one exemplary embodiment of a central ETHERNET switch cluster (CESC) node suitable for use in the system of FIG. 1.

FIG. 5 is a block diagram illustrating one exemplary embodiment of a central ETHERNET switch cluster (CESC) node 170 suitable for use in the system 100 of FIG. 1. As noted above, the central ETHERNET switch cluster 170 can be implemented in different ways. The embodiment shown in FIG. 5 is only one example of how the CESC 170 can be implemented.

In the particular exemplary embodiment shown in FIG. 5, the CESC 170 is implemented using a matrix of switch devices arranged in an architecture having at least two stages—an inner stage 502 (sometimes also referred to as a "spine" stage 502) and one or more outer stages 504 (sometimes also referred to as a "leaf" stage or "leave" stages 504). The inner stage 502 includes one or more inner-stage switches 506, and each outer stage 504 includes or more outer-stage switches 508.

Some of the ports 510 of the outer-stage switches 508 are used for external traffic (and are also referred to here as "external ports 510"), and the remaining ports 512 of each outer-stage switch 508 are used for establishing a full mesh of connections with ports 514 of the inner-stage switches 506. The ports 512 of each outer-stage switch 508 that are used to establish connections with the inner-stage switches 506 are also referred to here as "internal ports 512."

Traffic enters the CESC 170 at one of the external ports 510 of an outer-stage switch 508. That outer-stage switch 508 forwards each packet to one of the inner-stage switches 506. That inner-stage switch 506 forwards the packet to an internal port 512 of one of the outer-stage switches 508. That outer-stage switch 508 forwards the packet out of the CESC 170 via one of its external ports 510.

In this example, the local ETHERNET switch 302 in each BLO node 300 can be implemented as a part of the CESC 170. More specifically, in this example, the local ETHERNET switch 302 in each BLO node 300 can be implemented as one of the outer-stage switches 508 in the outer-stage 504 of the CESC 170. In the particular example shown in FIG. 5, the outer-stage switches 508 also includes switches that are not a part of a BLO node 300 (for example, for directly connecting other nodes to the CESC 170 such as IQSCs 116, C-RAN controllers 142, and/or C-RAN remotes 144).

Also, as noted above, although the CESC 170 is described here as being implemented using ETHERNET switches, it is to be understood that the CESC 170 can be implemented in other ways. For example, as noted above, the CESC 170 can be implemented using a single switch and/or other packet switching technology and devices (such as PCI-E, SRIO, and MPLS technology and devices).

Figure 6:
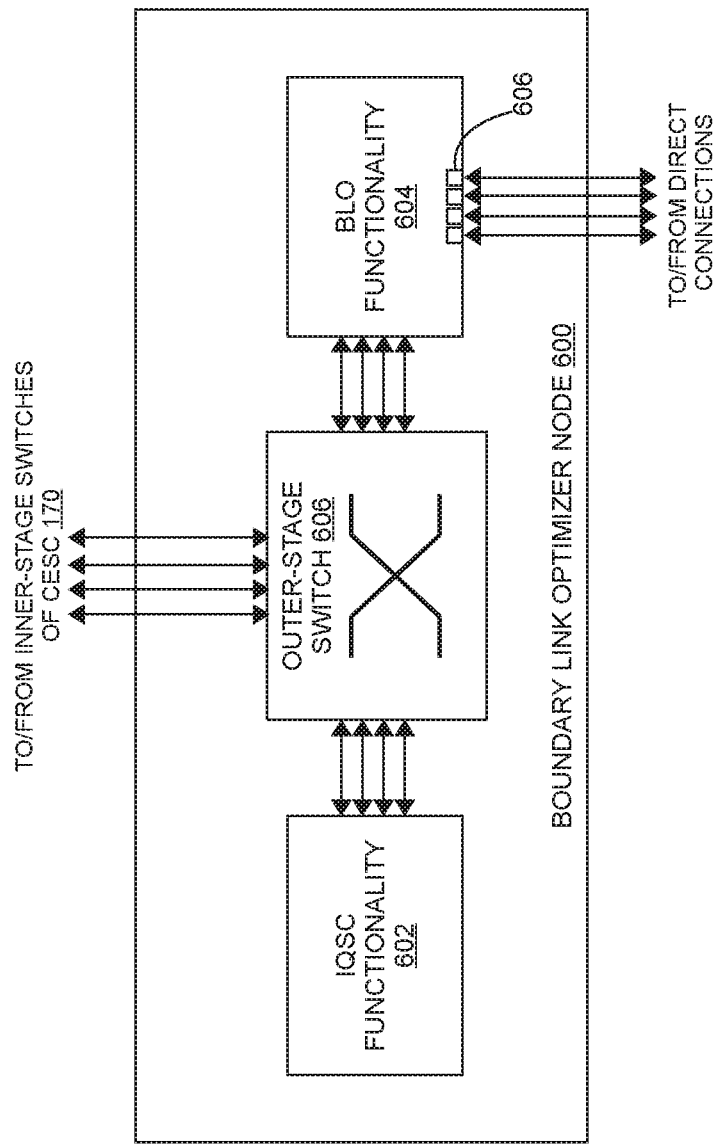
FIG. 6 is a block diagram illustrating an exemplary embodiment of a boundary link optimizer node that integrates other functionality into a single node suitable for use in the system of FIG. 1.

In the exemplary embodiment described above, the IQSC units 116, BLO nodes 124, and the CESC 170 are generally described as being as separate nodes on the network 106. FIG. 6 is a block diagram illustrating an exemplary embodiment of a boundary link optimizer node 600 that integrates such functionality into a single node suitable for use in the system 100 described above.

The BLO node 600 comprises IQSC functionality 602 that implements the functionality described above as being implemented in the IQSC units 116 and BLO functionality 604 that implements the functionality described above as being implemented in the standalone BLO nodes 134. Also, in this exemplary embodiment, the BLO node 600 further comprises at least one outer-stage switch 606 that is a part of a CESC 170 implemented as shown in FIG. 5.

That is, the IQSC functionality 602, the BLO functionality 604, and the outer-stage switch 606 is integrated into a single node 600. Doing this reduces the delay associated with communicating digital IQ streams between the IQSC units 116, the BLO nodes 134, and the outer-stage switches of the CESC 170, which reduces the overall delay of communication digital IQ streams over the network 106.

The IQSC functionality 602, the BLO functionality 604, and the outer-stage switch 606 can be implemented in software executing on one or more suitable programmable processors along with one or more suitable ETHERNET interfaces (for example, on one or more processors of a server computer). The IQSC functionality 602, the BLO functionality 604, and the outer-stage switch 606 (or portions thereof) can be implemented in other ways (for example, in a field programmable gate array (FPGA), application specific integrated circuit (ASIC), etc.).

As shown in FIG. 6, the BLO node 600 can include direct breakout ports 606 so that direct connections can be established between the BLO node 600 and sources and sinks of IQ traffic. This can be done to decrease front-haul latency. Such direct connections can be provided over ETHERNET links (for example, implemented using direct boundary links 120 between the BLO node 600 and the source and sink of IQ traffic). These direct connections can also be implemented in other ways (for example, via conventional dedicated, synchronized, serial communication links between the BLO node 600 and the source and sink of IQ traffic).

Figure 7:
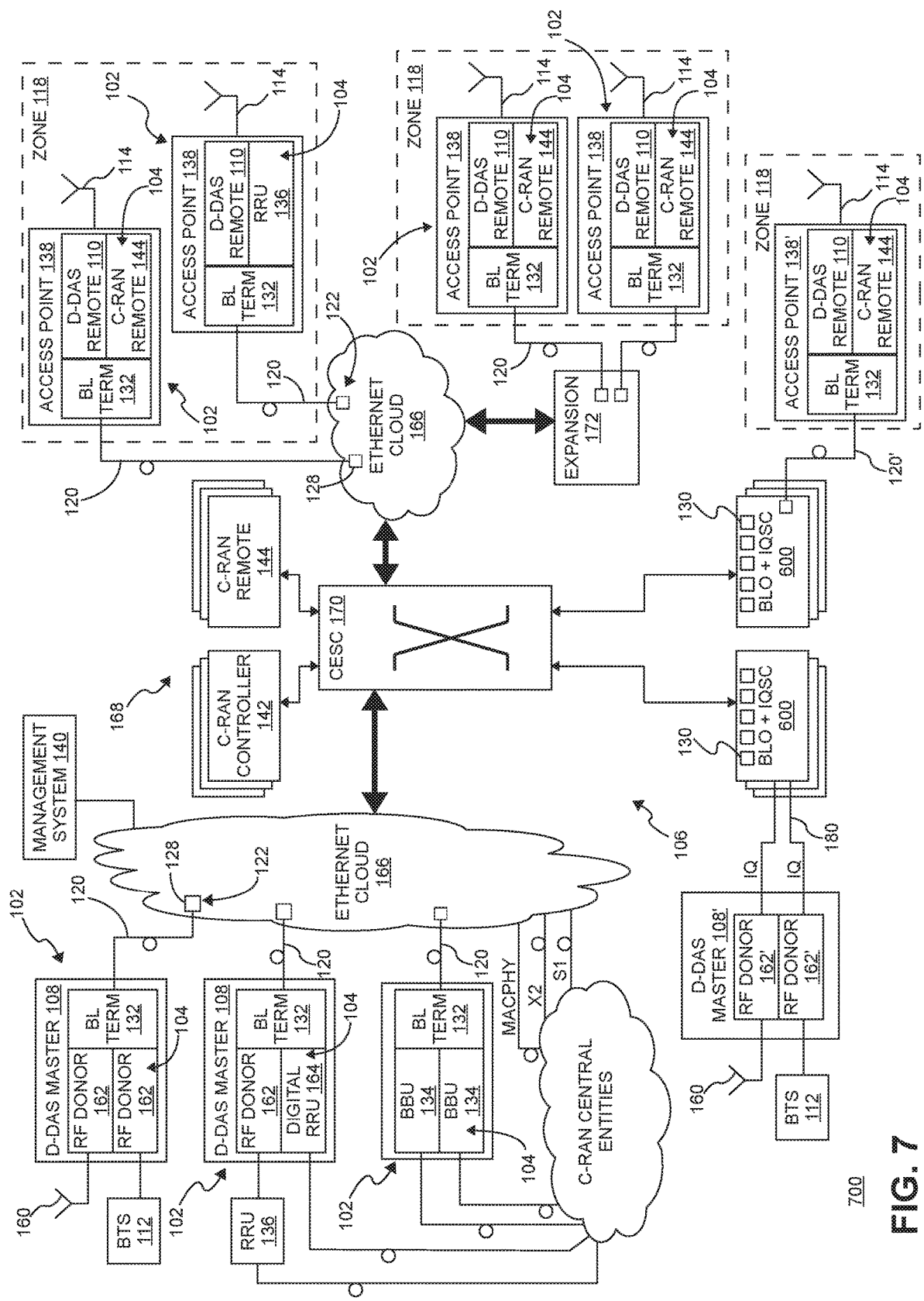
FIG. 7 is a block diagram of another exemplary embodiment of a system for transporting a plurality of serial streams of digital samples from one or more end nodes comprising one or more source entities to one or more other end nodes comprising one or more sink entities.

One example of a system where BLO nodes 600 are used with direct connections is shown in FIG. 7. FIG. 7 is a block diagram that illustrates one exemplary embodiment of a system 700. System 700 is a modified version of the system 100 shown in FIG. 1 in which the IQSC units 116 and BLO nodes 124 of FIG. 1 are replaced with integrated BLO nodes 600 of the type described above in connection with FIG. 6. In this exemplary embodiment, one or more BLO nodes 600 provide direct connections to one or more sources and sinks of IQ traffic.

More specifically, in the example shown in FIG. 7, one or more integrated BLO nodes 600 are used to provide direct connections to one or more digital DAS master units 108' and one or more access points 138'. Although only one digital DAS master unit 108' and one access point 138' are shown in FIG. 7 as being directly connected to a BLO node 600 for ease of explanation, it is to be understood that a different number of digital DAS master units 108' and/or access points 138' can be directly coupled to BLO nodes 600. Moreover, although the digital DAS master unit 108' includes two RF donor cards 162' in this exemplary embodiment, it is to be understood that the digital DAS master unit 108' can be implemented in other ways (for example, using a different number of RF donor cards 162' and/or different sources and sinks of digital IQ traffic, such as digital RRH cards and/or BBU cards).

In the example shown in FIG. 7, the direct connections between the RF donor cards 162' and the BLO node 600 are not provided over boundary links and instead are provided via conventional dedicated, synchronized, serial communication links. The BLO functionality 604 in the node 600 can include an appropriate interface to terminate each direct connection between the RF donor card 162' and the BLO functionality 604. The interface can be coupled to the appropriate functionality in the BLO node 600 that processes the streams of digital IQ samples communicated over the associated direct connection. For example, in this example, downstream streams of digital IQ samples received from the RF donor card 162' over such a direct connection can be provided from the interface that terminates that connection to an IQ switch in the ingress communication path of the BLO functionality 604. Likewise, upstream steams of digital IQ samples that are sent to the RF donor card 162' over the direct connection can be provided to the associated interface from the stream synchronization function in the egress communication path of the BLO functionality 604.

In the example shown in FIG. 7, the direct connection between the access point 138' and the BLO node 600 is provided over a direct boundary link 120'. The direct boundary link 120' is implemented in the same manner as described above, except that IQOE packets are communicated directly between the BLO node 600 and the access point 138'; the shared portions 166 of the ETHERNET network 106 are not used.

As noted above, the direct connections provided from the BLO nodes 600 to the digital DAS master unit 108' and the access point 138' can be used to reduce front-haul latency.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a non-transitory storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system comprising: an end node comprising one or more sink entities for a plurality of streams of digital samples, wherein the digital samples for the plurality of streams are indicative of one or more portions of wireless spectrum in which information is communicated in accordance with one or more wireless air interfaces; and a boundary link optimization node; wherein the end node and the boundary link optimizer node are communicatively coupled to an ETHERNET network; wherein the end node is communicatively coupled to the ETHERNET network using a boundary link that is connected to an edge of the ETHERNET network; wherein a virtual local area network (VLAN) is established in the ETHERNET network that includes: a first end point at the edge of the ETHERNET network to which the boundary link is connected and a second end point at the boundary link optimizer node; and wherein the boundary link optimizer node is configured to: receive ETHERNET packets that include data for the plurality of streams of digital samples; extract the data for the plurality of streams from the received ETHERNET packets; bundle the data for the streams of digital samples; and communicate, to the end node over the VLAN, the bundled data for the streams of digital samples in ETHERNET packets.

Example 2 includes the system of Example 1, wherein the end node comprises a boundary link termination module that terminates the boundary link at the end node, wherein the boundary link termination module is configured to: receive the ETHERNET packets communicated to the end node over the VLAN; extract the bundled the data for the streams of digital samples; and provide the extracted data for the streams of digital samples to the one or more sink entities.

Example 3 includes the system of any of the Examples 1-2, wherein the one or more portions of wireless spectrum in which the information is communicated in accordance with the one or more wireless air interfaces comprises at least one of: one or more wireless carriers; one or more wireless frequency bands; and one or more wireless sub-bands of one or more wireless frequency bands.

Example 4 includes the system of any of the Examples 1-3, wherein the end node comprises a digital distributed antenna system (DAS) master unit, wherein the one or more sink entities generates one or more analog wireless signals from the data for the streams of digital samples included in the ETHERNET packets communicated to the end node over the VLAN, the one or more analog wireless signals include the one or more portions of wireless spectrum in which the information is communicated in accordance with the one or more wireless air interfaces; and wherein the one or more analog wireless signals are provided to one or more base stations.

Example 5 includes the system of Example 4, wherein the one or more sink entities comprises one or more of: a radio frequency donor card; and a digital remote radio unit (RRU) card.

Example 6 includes the system of any of the Examples 1-5, wherein the end node comprises a cloud radio access network (C-RAN) central unit, wherein the one or more sink entities generate user data and control data from the data for the streams of digital samples included in the ETHERNET packets communicated to the end node over the VLAN, wherein the user data and the control data is provided to one or more core networks for one or more wireless carriers.

Example 7 includes the system of any of the Examples claim 1-6, wherein the one or more sink entities generates one or more analog wireless signals from the data for the streams of digital samples included in the ETHERNET packets communicated to the end node over the VLAN, the one or more analog wireless signals include the one or more portions of wireless spectrum in which the information is communicated in accordance with the one or more cellular air interfaces; and wherein the one or more analog wireless signals are radiated from one or more antennas.

Example 8 includes the system of any of the Examples 1-7, the one or more sink entities comprises one or more of a digital distributed antenna system (DAS) remote unit and a radio access network (RAN) remote radio unit.

Example 9 includes the system of any of the Examples 1-8, wherein the boundary link optimizer node is configured to: receive ETHERNET packets that do not include data for any of the plurality of streams of digital samples and that have a larger payload size; segment the received ETHERNET packets that have a larger payload size into ETHERNET frames having a smaller payload size; and communicate, to the end node over the VLAN, ETHERNET packets that comprise one of the ETHERNET frames.

Example 10 includes the system of Example 9, wherein the ETHERNET packets having a payload comprising one of the ETHERNET frames are communicated over the VLAN in connection with providing front haul transport between a cloud radio access network (C-RAN) central entity and a C-RAN remote entity.

Example 11 includes the system of any of the Examples 9-10, wherein the larger payload size comprises at least 1500 bytes.

Example 12 includes the system of any of the Examples 1-11, further comprising one or more second end nodes comprising one or more source entities that generate the plurality of streams of digital samples, wherein the one or more second end nodes are communicatively coupled to the ETHERNET network.

Example 13 includes the system of Example 12, wherein the one or more source entities comprises one or more of a digital RF donor card, a digital DAS remote radio unit (RRU) card, and a radio access network (RAN) baseband unit.

Example 14 includes the system of any of the Examples 1-13, wherein the system includes one or more boundary link optimizer nodes; wherein each of the second end nodes is communicatively coupled to the ETHERNET network using a respective boundary link that is connected to a respective edge of the ETHERNET network; wherein, for each of the second end nodes, a respective VLAN is established in the ETHERNET network that includes: a first end point at the edge of the ETHERNET network to which the respective boundary link is connected and a second end point at the boundary link optimizer node; and wherein for each of the one or more second end nodes, data for each of the plurality of streams of digital samples generated at that second end node is bundled together with data for any other streams of digital samples generated at that second end node and communicate the bundled data in ETHERNET packets over the respective VLAN established for that second end node to the respective boundary link optimizer node.

Example 15 includes the system of any of the Examples 1-14, wherein the boundary link optimizer node is configured to perform digital signal processing on at least one of the streams of digital samples.

Example 16 includes the system of any of the Examples 1-15, wherein the boundary link optimizer node is further configured to: digitally simulcast ETHERNET packets that include data for the plurality of streams of digital samples to a plurality of end nodes; and digitally combine ETHERNET packets that include data for the plurality of streams of digital samples from a plurality of end nodes.

Example 17 includes the system of any of the Examples 1-16, further comprising a packet switch cluster configured to switch the ETHERNET packets that include data for the plurality of streams of digital samples.

Example 18 includes the system of Example 17, wherein the packet switch cluster comprises a plurality of switches.

Example 19 includes the system of any of the Examples 17-18, wherein the boundary link optimizer node includes at least one of the switches of the packet switch cluster.

Example 20 includes the system of any of the Examples 1-19, wherein the boundary link optimizer node comprises at least one port configured to provide a direct connection to a second end node comprising one or more second sink or source entities for a plurality of streams of digital samples.

Example 21 includes a method of transporting, using an ETHERNET network, a plurality of streams of digital samples to an end node comprising one or more sink entities for the plurality of streams of digital samples, the method comprising: receiving, at a boundary link optimizer node communicatively coupled to the ETHERNET network, ETHERNET packets that include data for the plurality of streams of digital samples; wherein the digital samples for the plurality of streams are indicative of one or more portions of wireless spectrum in which information is communicated in accordance with one or more cellular air interfaces; wherein the edge node is communicatively coupled to the ETHERNET network using a boundary link that is connected to an edge of the ETHERNET network; and wherein a virtual local area network (VLAN) is established in the ETHERNET network that includes: a first end point at the edge of the ETHERNET network to which the boundary link is connected and a second end point at the boundary link optimizer node; and wherein the method further comprises: extracting, at the boundary link optimizer node, the data for the plurality of streams from the received ETHERNET packets; bundling, at the boundary link optimizer node, the data for the streams of digital samples; and communicating the bundled data for the streams of digital samples to the edge node in ETHERNET packets from the boundary link optimizer node over the VLAN.

Example 22 includes the method of Example 21, further comprising: receiving, at the edge node, the ETHERNET packets communicated to the edge node over the VLAN; extracting the bundled the data for the streams of digital samples; and providing the extracted data for the streams of digital samples to the one or more sink entities Example 23 includes the method of any of the Examples 21-22, wherein the one or more portions of wireless spectrum in which the information is communicated in accordance with the one or more wireless air interfaces comprises at least one of: one or more wireless carriers; one or more wireless frequency bands; and one or more wireless sub-bands of one or more wireless frequency bands.

Example 24 includes the method of any of the Examples 21-23, wherein the end node comprises a digital distributed antenna system (DAS) master unit; and wherein the method further comprises: generating, by the one or more sink entities, one or more analog wireless signals from the data for the streams of digital samples included in the ETHERNET packets communicated to the end node over the VLAN, the one or more analog wireless signals include the one or more portions of wireless spectrum in which the information is communicated in accordance with the one or more cellular air interfaces; and providing the one or more analog wireless signals to one or more base stations.

Example 25 includes the method of Example 24, wherein the one or more sink entities comprises one or more of: a radio frequency donor card; and a digital distributed antenna system (DAS) remote radio unit (RRU) card.

Example 26 includes the method of any of the Examples 21-25, wherein the end node comprises a cloud radio access network (C-RAN) central unit; and wherein method further comprises: generating, by the one or more sink entities, user data and control data from the data for the streams of digital samples included in the ETHERNET packets communicated to the end node over the VLAN; and providing the user data and the control data to one or more core networks for one or more wireless carriers.

Example 27 includes the method of any of the Examples 21-26, wherein the method further comprises: generating, by the one or more sink entities, one or more analog wireless signals from the data for the streams of digital samples included in the ETHERNET packets communicated to the end node over the VLAN, the one or more analog wireless signals include the one or more portions of wireless spectrum in which the information is communicated in accordance with the one or more cellular air interfaces; and radiating the one or more analog wireless signals from one or more antennas.

Example 28 includes the method of any of the Examples 21-27, the one or more sink entities comprises one or more of a digital distributed antenna system (DAS) remote entity and a radio access network (RAN) remote radio unit.

Example 29 includes the method of any of the Examples 21-28, further comprising: receiving ETHERNET packets that do not include data for any of the plurality of streams of digital samples and that have a larger payload size; segmenting the received ETHERNET packets that have a larger payload size into smaller ETHERNET frames having a smaller payload size; and communicating, to the end node over the VLAN, ETHERNET packets that comprise one of the ETHERNET frames.

Example 30 includes the method of Example 29, wherein the ETHERNET packets having a payload comprising one of the ETHERNET frames are communicated over the VLAN in connection with providing front haul transport between a cloud radio access network (C-RAN) central entity and a C-RAN remote entity.

Example 31 includes the method of any of the Examples 29-30, wherein the larger payload size comprises at least 1500 bytes.

Example 32 includes the method of any of the Examples 21-31, further comprising: generating, by one or more source entities included in one or more second end nodes, the plurality of streams of digital samples, wherein the one or more second end nodes are communicatively coupled to the ETHERNET network.

Example 33 includes the method of Example 32, wherein the one or more source entities comprises one or more of a digital RF donor card, a digital distributed antenna system (DAS) remote radio unit (RRU) card, and a radio access network (RAN) central entity.

Example 34 includes the method of any of the Examples 32-33, wherein the system includes one or more boundary link optimizer nodes; wherein each of the second end nodes is communicatively coupled to the ETHERNET network using a respective boundary link that is connected to a respective edge of the ETHERNET network; wherein, for each of the second end nodes, a respective VLAN is established in the ETHERNET network that includes: a first end point at the edge of the ETHERNET network to which the respective boundary link is connected and a second end point at the boundary link optimizer node; and wherein the method further comprises: for each of the one or more second end nodes: bundling data for each of the plurality of streams of digital samples generated at that second end node together with data for any other streams of digital samples generated at that second end node; and communicating the bundled data in ETHERNET packets over the respective VLAN established for that second end node to the respective boundary link optimizer node.

Example 35 includes the method of any of the Examples 21-34, wherein the method further comprises performing digital signal processing on at least one of the streams of digital samples by at least one boundary link optimizer node.

Example 36 includes the method of any of the Examples 21-35, wherein the method further comprises: digitally simulcasting, by the boundary link optimizer node, ETHERNET packets that include data for the plurality of streams of digital samples to a plurality of end nodes; and digitally combining, by the boundary link optimizer node, ETHERNET packets that include data for the plurality of streams of digital samples from a plurality of end nodes.

Example 37 includes the method of any of the Examples 21-36, wherein the network comprising a packet switch cluster configured to switch the ETHERNET packets that include data for the plurality of streams of digital samples.

Example 38 includes the method of Example 37, wherein the packet switch cluster comprises a plurality of switches.

Example 39 includes the method of any of the Examples 37-39, wherein the boundary link optimizer node includes at least one of the switches of the packet switch cluster.

Example 40 includes the method of any of the Examples 21-39, further comprising: communicating streams of digital samples with a second edge node over a direct connection with the second end node.

Example 41 includes a boundary link optimizer node to communicate with an end node comprising one or more sink entities for a plurality of streams of digital samples, wherein the digital samples for the plurality of streams are indicative of one or more portions of wireless spectrum in which information is communicated in accordance with one or more cellular air interfaces, the node comprising: at least one ETHERNET interface to communicatively couple the boundary link optimizer node to an ETHERNET, wherein the end node is communicatively coupled to the ETHERNET network using a boundary link that is connected to an edge of the ETHERNET network and wherein a virtual local area network (VLAN) is established in the ETHERNET network that includes: a first end point at the edge of the ETHERNET network to which the boundary link is connected and a second end point at the boundary link optimizer node; at least one programmable processor configured to execute software, wherein the software is operable to cause the boundary link optimizer node to: extract data for the plurality of streams from ETHERNET packets that include data for the plurality of streams of digital samples that are received at the boundary link optimizer node; bundle the data for the streams of digital samples; and communicate the bundled data for the streams of digital samples to the end node in ETHERNET packets over the VLAN.

Example 42 includes the boundary link optimizer node of Example 41, wherein the software is operable to cause the boundary link optimizer node to implement a plurality of boundary link optimizer entities; and wherein the boundary link optimizer node implements a local ETHERNET switch that forwards received ETHERNET packets to each of the bound link optimizer entities.

Example 43 includes the boundary link optimizer node of any of the Examples 41-42, wherein the one or more portions of wireless spectrum in which the information is communicated in accordance with the one or more wireless air interfaces comprises at least one of: one or more wireless carriers; one or more wireless frequency bands; and one or more wireless sub-bands of one or more wireless frequency bands.

Example 44 includes the boundary link optimizer node of any of the Examples 41-43, wherein the boundary link optimizer node is configured to receive ETHERNET packets that do not include data for any of the plurality of streams of digital samples and that have a larger payload size and segment the received ETHERNET packets that have a larger payload size into smaller ETHERNET frames having a smaller payload size; and communicate, to the end node over the VLAN, ETHERNET packets that comprise one of the ETHERNET frames.

Example 45 includes the boundary link optimizer node of Example 44, wherein the ETHERNET packets having a payload comprising one of the ETHERNET frames are communicated over the VLAN in connection with providing front haul transport between a cloud radio access network (C-RAN) central entity and a C-RAN remote entity.

Example 46 includes the boundary link optimizer node of any of the Examples 44-45, wherein the larger payload size comprises at least 1500 bytes.

Example 47 includes the boundary link optimizer node of any of the Examples 41-46, further comprising a router that is configured to segment the received ETHERNET packets that have the larger payload size into the smaller ETHERNET frames having the smaller payload size.

Example 48 includes the boundary link optimizer node of any of the Examples 41-47, wherein the boundary link optimizer node is configured to perform digital signal processing on at least one of the streams of digital samples.

Example 49 includes the boundary link optimizer node of any of the Examples 41-48, wherein the boundary link optimizer node is further configured to: digitally simulcast ETHERNET packets that include data for the plurality of streams of digital samples to a plurality of end nodes; and digitally combine ETHERNET packets that include data for the plurality of streams of digital samples from a plurality of end nodes.

Example 50 includes the boundary link optimizer node of any of the Examples 41-49, wherein the ETHERNET network comprises a packet switch cluster configured to switch the ETHERNET packets that include data for the plurality of streams of digital samples.

Example 51 includes the boundary link optimizer node of any of the Examples 41-50, wherein the packet switch cluster comprises a plurality of switches.

Example 52 includes the boundary link optimizer node of any of the Examples 41-51, wherein the boundary link optimizer node includes at least one of the switches of the packet switch cluster.

Example 53 includes the boundary link optimizer node of any of the Examples 41-52, further comprising at least one port configured to provide a direct connection to a second end node comprising one or more second sink or source entities for a plurality of streams of digital samples.

What is claimed is:

1. A radio access network (RAN) system comprising:
a baseband unit (BBU);
a plurality of remote radio units, wherein each of the remote radio units is located remotely from the BBU; and
an intermediary unit comprising at least one Ethernet interface;
wherein the BBU, the remote radio units, and the intermediary unit are communicatively coupled to each other via a switched Ethernet network;
wherein the BBU is configured to transmit downlink fronthaul data to the intermediary unit via the switched Ethernet network as packet data, the packet data transmitted to the intermediary unit having the intermediary unit as a destination;
wherein the intermediary unit comprises circuitry configured to receive the downlink fronthaul data from the BBU and simulcast the downlink fronthaul data to the remote radio units via the switched Ethernet network as respective packet data, the respective packet data simulcast to each remote radio unit having that remote radio unit as a destination;
wherein each remote radio unit is configured to receive the downlink fronthaul data and generate therefrom at least one downlink radio frequency signal for wireless communication to user equipment (UE) via an associated at least one antenna; and
wherein the downlink fronthaul data comprises in-phase and quadrature (IQ) data.

2. The RAN system of claim 1, wherein at least some downlink physical layer processing for an air interface used for wirelessly communicating with the UE is performed in the remote radio units; and
wherein the downlink fronthaul data comprises data used in performing said at least some downlink physical layer processing for the air interface in the remote radio units.

3. The RAN system of claim 1, wherein the downlink fronthaul data is formatted in accordance with an interface between a media access control layer of an air interface used for wirelessly communicating with the UE and a physical layer of the air interface.

4. The RAN system of claim 1, wherein the RAN system is configured to optimize communication of the downlink fronthaul data from the BBU to the intermediary unit via the switched Ethernet network as packet data.

5. The RAN system of claim 1, wherein each of the remote radio units is configured to receive, via at least one antenna, at least one uplink radio frequency signal wirelessly communicated from the UE and generate therefrom respective uplink fronthaul data and communicate the respective uplink fronthaul data to the intermediary unit via the switched Ethernet network.

6. The RAN system of claim 5, wherein the RAN system is configured to optimize communication of the uplink fronthaul data from the intermediary unit to the BBU via the switched Ethernet network.

7. The RAN system of claim 5, wherein the intermediary unit comprises circuitry configured to combine the respective uplink fronthaul data communicated to the intermediary unit from the remote radio units in order to generate combined uplink fronthaul data, wherein the intermediary unit comprises circuitry configured to transmit the combined uplink fronthaul data to the BBU via the switched Ethernet network.

8. The RAN system of claim 5, wherein the intermediary unit comprises circuitry configured to combine the respective uplink fronthaul data communicated to the intermediary unit from the remote radio units in order to generate the combined uplink fronthaul data by digitally summing the respective uplink fronthaul data communicated to the intermediary unit from the remote radio units.

9. The RAN system of claim 5, wherein at least some uplink physical layer processing for an air interface used for wirelessly communicating with the UE is performed in the BBU; and
wherein the uplink fronthaul data comprises data used for performing said at least some uplink physical layer processing for the air interface in the BBU.

10. The RAN system of claim 9, wherein the uplink fronthaul data comprises IQ data.

11. The RAN system of claim 5, wherein the uplink fronthaul data is formatted in accordance with an interface between the media access control layer of an air interface used for wirelessly communicating with the UE and the physical layer of the air interface.

12. The RAN system of claim 1, wherein the intermediary unit comprises at least one of: a simulcast/combiner unit and a boundary link optimizer node.

13. A radio access network (RAN) system comprising:
a baseband unit (BBU);
a plurality of remote radio units, wherein each of the remote radio units is located remotely from the BBU; and
an intermediary unit comprising at least one Ethernet interface;
wherein the BBU, the remote radio units, and the intermediary unit are communicatively coupled to each other via a switched Ethernet network;
wherein each of the remote radio units is configured to receive, via at least one antenna, at least one uplink radio frequency signal wirelessly communicated from user equipment (UE) and generate therefrom respective uplink fronthaul data and communicate the respective uplink fronthaul data to the intermediary unit via the switched Ethernet network as respective packet data having the intermediary unit as a destination;
wherein the intermediary unit comprises circuitry configured to combine the respective uplink fronthaul data communicated to the intermediary unit from the remote radio units in order to generate combined uplink fronthaul data, wherein the intermediary unit comprises circuitry configured to transmit the combined uplink fronthaul data to the BBU via the switched Ethernet network; and
wherein the uplink fronthaul data comprises in-phase and quadrature (IQ) data.

14. The RAN system of claim 13, wherein the intermediary unit comprises circuitry configured to combine the respective uplink fronthaul data communicated to the intermediary unit from the remote radio units in order to generate the combined uplink fronthaul data by digitally summing the respective uplink fronthaul data communicated to the intermediary unit from the remote radio units.

15. The RAN system of claim 13, wherein at least some uplink physical layer processing for an air interface used for wirelessly communicating with the UE is performed in the BBU; and
wherein the uplink fronthaul data comprises data used for performing said at least some uplink physical layer processing for the air interface in the BBU.

16. The RAN system of claim 13, wherein the uplink fronthaul data is formatted in accordance with an interface between the media access control layer of an air interface used for wirelessly communicating with the UE and the physical layer of the air interface.

17. A radio access network (RAN) system comprising:
a baseband unit (BBU);
a plurality of remote radio units, wherein each of the remote radio units is located remotely from the BBU; and
an intermediary unit comprising at least one Ethernet interface;
wherein the BBU, the remote radio units, and the intermediary unit are communicatively coupled to each other via a switched Ethernet network;
wherein the BBU is configured to transmit downlink fronthaul data via the switched Ethernet network as packet data having the intermediary unit as a destination;
wherein each remote radio unit is configured to receive the downlink fronthaul data and generate therefrom at least one downlink radio frequency signal for wireless communication to user equipment (UE) via an associated at least one antenna;
wherein the RAN system is configured to optimize communication of the downlink fronthaul data to the remote radio units via the switched Ethernet network as respective packet data using the intermediary unit, the respective packet data communicated to each remote radio unit having that remote radio unit as a destination;
wherein the BBU is configured to communicate with the intermediary unit via the switched Ethernet network using the packet data having the intermediary unit as the destination; and
wherein the downlink fronthaul data comprises in-phase and quadrature (IQ) data.

18. The RAN system of claim 17, wherein at least some downlink physical layer processing for an air interface used for wirelessly communicating with the UE is performed in the remote radio units; and
wherein the downlink fronthaul data comprises data used for performing said at least some downlink physical layer processing for the air interface in the remote radio units.

19. The RAN system of claim 17, wherein the downlink fronthaul data is formatted in accordance with an interface between the media access control layer of an air interface used for wirelessly communicating with the UE and the physical layer of the air interface.

20. The RAN system of claim 17, wherein the RAN system is configured to optimize communication of the downlink fronthaul data from the BBU to the remote radio units via the switched Ethernet network as packet data using the intermediary unit by receiving a single instance of the downlink fronthaul data from the BBU at the intermediary unit via the switched Ethernet network and by simulcasting multiple instances of the downlink fronthaul data from the intermediary unit to the remote radio units via the switched Ethernet network as packet data so that a respective one of the multiple instances of the downlink fronthaul data is received at each of the remote radio units.

21. The RAN system of claim 17, wherein each of the remote radio units is configured to receive, via at least one antenna, at least one uplink radio frequency signal wirelessly communicated from the UE and generate therefrom respective uplink fronthaul data and communicate the respective uplink fronthaul data to the BBU via the switched Ethernet network; and wherein the RAN system is configured to optimize communication of the uplink fronthaul data from the remote radio units to the BBU via the switched Ethernet network using the intermediary unit.

22. The RAN system of claim 21, wherein the RAN system is configured to optimize communication of the uplink fronthaul data from the remote radio units to the BBU via the switched Ethernet network using the intermediary unit by communicating the respective uplink fronthaul data from the remote radio units to the intermediary unit, combining the respective uplink fronthaul data communicated to the intermediary unit from the remote radio units in order to generate combined uplink fronthaul data, and transmitting the combined uplink fronthaul data from the intermediary unit to the BBU via the switched Ethernet network.

23. The RAN system of claim 21, wherein at least some uplink physical layer processing for an air interface used for wirelessly communicating with the UE is performed in the BBU; and wherein the uplink fronthaul data comprises data used for performing said at least some uplink physical layer processing for the air interface in the BBU.

24. The RAN system of claim 23, wherein the uplink fronthaul data comprises IQ data.

25. The RAN system of claim 21, wherein the uplink fronthaul data is formatted in accordance with an interface between the media access control layer of an air interface used for wirelessly communicating with the UE and the physical layer of the air interface.

26. The RAN system of claim 17, wherein the intermediary unit comprises at least one of: a simulcast/combiner unit and a boundary link optimizer node.

27. A radio access network (RAN) system comprising:
a baseband unit (BBU);
a plurality of remote radio units, wherein each of the remote radio units is located remotely from the BBU; and
an intermediary unit comprising at least one Ethernet interface;
wherein the BBU, the remote radio units, and the intermediary unit are communicatively coupled to each other via a switched Ethernet network;
wherein each of the remote radio units is configured to receive, via at least one antenna, at least one uplink radio frequency signal wirelessly communicated from user equipment (UE) and generate therefrom respective uplink fronthaul data and communicate the respective uplink fronthaul data via the switched Ethernet network as respective packet data having the intermediary unit as a destination;
wherein the RAN system is configured to optimize communication of the uplink fronthaul data to the BBU via the switched Ethernet network as packet data using the intermediary unit;
wherein the BBU is configured to communicate with the intermediary unit via the switched Ethernet network; and
wherein the uplink fronthaul data comprises in-phase and quadrature (IQ) data.

28. The RAN system of claim 27, wherein the RAN system is configured to optimize communication of the uplink fronthaul data to the BBU via the switched Ethernet network as packet data using the intermediary unit by communicating the respective uplink fronthaul data from the remote radio units to the intermediary unit, combining the respective uplink fronthaul data communicated to the intermediary unit from the remote radio units in order to generate combined uplink fronthaul data, and transmitting the combined uplink fronthaul data from the intermediary unit to the BBU via the switched Ethernet network.

29. The RAN system of claim 27, wherein at least some uplink physical layer processing for an air interface used for wirelessly communicating with the UE is performed in the BBU; and wherein the uplink fronthaul data comprises data used for performing said at least some uplink physical layer processing for the air interface in the BBU.

30. The RAN system of claim 27, wherein the uplink fronthaul data is formatted in accordance with an interface between the media access control layer of an air interface used for wirelessly communicating with the UE and the physical layer of the air interface.

31. A method for use with a radio access network (RAN) system that comprises a baseband unit (BBU), a plurality of remote radio units, and an intermediary unit, wherein each of the remote radio units is located remotely from the BBU, and wherein the BBU, the remote radio units, and the intermediary unit are communicatively coupled to each other via a switched Ethernet network, the method comprises:

transmitting downlink fronthaul data from the BBU to the intermediary unit via the switched Ethernet network as packet data, the packet data transmitted to the intermediary unit having the intermediary unit as a destination;
receiving the downlink fronthaul data from the BBU at the intermediary unit;
simulcasting the downlink fronthaul data from the intermediary unit to the remote radio units via the switched Ethernet network as respective packet data, the respective packet data simulcast to each remote radio unit having that remote radio unit as a destination; and
receiving, at each remote radio unit, the downlink fronthaul data and generating therefrom at least one downlink radio frequency signal for wireless communication to user equipment (UE) via an associated at least one antenna; and
wherein the downlink fronthaul data comprises in-phase and quadrature (IQ) data.

32. The method of claim 31, wherein at least some downlink physical layer processing for an air interface used for wirelessly communicating with the UE is performed in the remote radio units; and wherein the downlink fronthaul data comprises data used for performing said at least some downlink physical layer processing for the air interface in the remote radio units.

33. The method of claim 31, wherein the downlink fronthaul data is formatted in accordance with an interface between the media access control layer of an air interface used for wirelessly communicating with the UE and the physical layer of the air interface.

34. A method for use with a radio access network (RAN) system that comprises a baseband unit (BBU), a plurality of remote radio units, and an intermediary unit, wherein each of the remote radio units is located remotely from the BBU, and wherein the BBU, the remote radio units, and the intermediary unit are communicatively coupled to each other via a switched Ethernet network, the method comprises:

receiving, at each of the remote radio units via at least one associated antenna, at least one uplink radio frequency signal wirelessly communicated from user equipment (UE) and generating therefrom a respective uplink fronthaul data;

communicating, from each of the remote radio units, the respective uplink fronthaul data generated at said remote radio unit to the intermediary unit via the switched Ethernet network as respective packet data having the intermediary unit as a destination; and combining the respective uplink fronthaul data communicated to the intermediary unit from the remote radio units in order to generate combined uplink fronthaul data; and transmitting the combined uplink fronthaul data from the intermediary unit to the BBU via the switched Ethernet network; and wherein the uplink fronthaul data comprises in-phase and quadrature (IQ) data.

35. The method of claim 34, wherein at least some uplink physical layer processing for an air interface used for wirelessly communicating with the UE is performed in the BBU; and wherein the uplink fronthaul data comprises data used for performing said at least some uplink physical layer processing for the air interface in the BBU.

36. The method of claim 34, wherein the uplink fronthaul data is formatted in accordance with an interface between the media access control layer of an air interface used for wirelessly communicating with the UE and the physical layer of the air interface.

37. A method for use with a radio access network (RAN) system that comprises a baseband unit (BBU), a plurality of remote radio units, and an intermediary unit, wherein each of the remote radio units is located remotely from the BBU, and wherein the BBU, the remote radio units, and the intermediary unit are communicatively coupled to each other via a switched Ethernet network, the method comprises:

transmitting downlink fronthaul data from the BBU via the switched Ethernet network as packet data having the intermediary unit as a destination;

optimizing communication of the downlink fronthaul data to the remote radio units via the switched Ethernet network as respective packet data using the intermediary unit, the respective packet data communicated to each remote radio unit having that remote radio unit as a destination; and receiving, at each remote radio unit, the downlink fronthaul data and generating therefrom at least one downlink radio frequency signal for wireless communication to user equipment (UE) via an associated at least one antenna; and wherein the BBU is configured to communicate with the intermediary unit via the switched Ethernet network; and wherein the downlink fronthaul data comprises in-phase and quadrature (IQ) data.

38. The method of claim 37, wherein at least some downlink physical layer processing for an air interface used for wirelessly communicating with the UE is performed in the remote radio units; and wherein the downlink fronthaul data comprises data used for performing said at least some downlink physical layer processing for the air interface in the remote radio units.

39. The method of claim 37, wherein the downlink fronthaul data is formatted in accordance with an interface between the media access control layer of an air interface used for wirelessly communicating with the UE and the physical layer of the air interface.

40. A method for use with a radio access network (RAN) system that comprises a baseband unit (BBU), a plurality of remote radio units, and an intermediary unit, wherein each of the remote radio units is located remotely from the BBU, and wherein the BBU, the remote radio units, and the intermediary unit are communicatively coupled to each other via a switched Ethernet network, the method comprises:

receiving, at each of the remote radio units via at least one associated antenna, at least one uplink radio frequency signal wirelessly communicated from user equipment (UE) and generating therefrom respective uplink fronthaul data;

communicating, from each of the remote radio units, the respective uplink fronthaul data generated at said remote radio unit via the switched Ethernet network as respective packet data having the intermediary unit as a destination; and optimizing communication of the uplink fronthaul data to the BBU via the switched Ethernet network as packet data using the intermediary unit; and wherein the BBU is configured to communicate with the intermediary unit via the switched Ethernet network; and wherein the uplink fronthaul data comprises in-phase and quadrature (IQ) data.

41. The method of claim 40, wherein at least some uplink physical layer processing for an air interface used for wirelessly communicating with the UE is performed in the BBU; and wherein the uplink fronthaul data comprises data used for performing said at least some uplink physical layer processing for the air interface in the BBU.

42. The method of claim 40, wherein the uplink fronthaul data is formatted in accordance with an interface between the media access control layer of an air interface used for wirelessly communicating with the UE and the physical layer of the air interface.

* * * * *